(12) United States Patent
Sasaki et al.

(10) Patent No.: US 12,331,371 B2
(45) Date of Patent: *Jun. 17, 2025

(54) STAINLESS STEEL PIPE AND METHOD FOR MANUFACTURING SAME

(71) Applicant: JFE Steel Corporation, Tokyo (JP)

(72) Inventors: Shunsuke Sasaki, Tokyo (JP); Masao Yuga, Tokyo (JP); Tatsuro Katsumura, Tokyo (JP); Hideo Kijima, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 386 days.

This patent is subject to a terminal disclaimer.

(21) Appl. No.: 17/800,283

(22) PCT Filed: Jan. 20, 2021

(86) PCT No.: PCT/JP2021/001884
§ 371 (c)(1),
(2) Date: Aug. 17, 2022

(87) PCT Pub. No.: WO2021/171836
PCT Pub. Date: Sep. 2, 2021

(65) Prior Publication Data
US 2023/0090536 A1 Mar. 23, 2023

(30) Foreign Application Priority Data
Feb. 27, 2020 (JP) ................. 2020-031195

(51) Int. Cl.
*C21D 9/08* (2006.01)
*C22C 38/00* (2006.01)
(Continued)

(52) U.S. Cl.
CPC ............. *C21D 9/08* (2013.01); *C22C 38/001* (2013.01); *C22C 38/004* (2013.01); *C22C 38/02* (2013.01);
(Continued)

(58) Field of Classification Search
None
See application file for complete search history.

(56) References Cited

U.S. PATENT DOCUMENTS 5,733,387 A * 3/1998 Lee .................. C21D 8/0226
148/609
6,749,697 B2 6/2004 Bergstrom et al.
(Continued)

FOREIGN PATENT DOCUMENTS

CN 101353769 A 1/2009
EP 2177634 A1 4/2010
(Continued)

OTHER PUBLICATIONS

Chinese Office Action with Search Report for Chinese Application No. 202180016167.5, dated Apr. 15, 2023, 9 pages.
(Continued)

*Primary Examiner* — Seth Dumbris
(74) *Attorney, Agent, or Firm* — Buchanan Ingersoll & Rooney PC

(57) ABSTRACT

A stainless steel pipe of a predetermined composition is provided that comprises N, Ti, Al, V, and Nb so as to satisfy the predetermined formula, the stainless steel pipe having an axial tensile yield strength of 757 MPa or more, an axial compressive yield strength/axial tensile yield strength ratio of 0.85 to 1.15, and a microstructure that is 20 to 80% ferrite phase by volume with the remainder containing an austenite phase, the stainless steel pipe having pipe end portions at least one of which has a fastening portion for an external thread or an internal thread, and having a curvature radius of 0.2 mm or more for a corner R formed by a bottom surface of a thread root and a pressure-side flank surface of the thread, measured in an axial plane section of the fastening portion.

20 Claims, 4 Drawing Sheets

(51) Int. Cl.
  *C22C 38/02* (2006.01)
  *C22C 38/04* (2006.01)
  *C22C 38/06* (2006.01)
  *C22C 38/44* (2006.01)
  *C22C 38/46* (2006.01)
  *C22C 38/48* (2006.01)
  *C22C 38/50* (2006.01)

(52) U.S. Cl.
  CPC .............. *C22C 38/04* (2013.01); *C22C 38/06* (2013.01); *C22C 38/44* (2013.01); *C22C 38/46* (2013.01); *C22C 38/48* (2013.01); *C22C 38/50* (2013.01)

(56) References Cited

U.S. PATENT DOCUMENTS

| | | | |
|---|---|---|---|
| 7,331,614 B2 * | 2/2008 | Noel ..................... | F16L 15/002 285/334 |
| 2015/0107724 A1 * | 4/2015 | Sawawatari ............ | C22C 38/02 148/325 |
| 2015/0354038 A1 * | 12/2015 | Kinugasa ............... | C22C 38/002 420/68 |
| 2015/0377391 A1 * | 12/2015 | Nagahama .............. | F16L 15/06 285/390 |
| 2017/0122468 A1 | 5/2017 | Sugino et al. | |
| 2019/0211416 A1 * | 7/2019 | Yoshimura .............. | C22C 38/46 |
| 2019/0211631 A1 * | 7/2019 | Yamaguchi ............ | E21B 17/042 |
| 2021/0108297 A1 | 4/2021 | Tsuge et al. | |
| 2022/0018007 A1 | 1/2022 | Sasaki et al. | |

FOREIGN PATENT DOCUMENTS

| | | |
|---|---|---|
| EP | 2853614 A1 | 4/2015 |
| EP | 3150896 A1 | 4/2017 |
| JP | 2001220652 A | 8/2001 |
| JP | 2003525354 A | 8/2003 |
| JP | 5500324 B1 | 5/2014 |
| JP | 2016-117944 A | 6/2016 |
| JP | 2017048424 A | 3/2017 |
| JP | 2018193591 A | 12/2018 |
| JP | 6604093 B2 | 11/2019 |
| WO | 2014034522 A1 | 3/2014 |
| WO | 2015182128 A1 | 12/2015 |
| WO | 2020110597 A1 | 6/2020 |

OTHER PUBLICATIONS

Extended European Search Report for European Application No. 21759555.2, dated Mar. 3, 2023, 8 pages.
International Search Report and Written Opinion for International Application No. PCT/JP2021/001884, dated Mar. 30, 2021, 6 pages.
Chinese Office Action for Chinese Application No. 202180016167.5, dated Jan. 6, 2024 with Concise Statement of Relevance of Office Action, 5 pages.
Office Action issued by the U.S. Patent and Trademark Office in the U.S. Appl. No. 17/296,626, mailed Feb. 8, 2024, U.S. Patent and Trademark Office, Alexandria, VA. (9 pages).
Office Action issued by the U.S. Patent and Trademark Office in the U.S. Appl. No. 17/296,626, mailed May 10, 2024, U.S. Patent and Trademark Office, Alexandria, VA. (10 pages).
Office Action issued by the U.S. Patent and Trademark Office in the U.S. Appl. No. 17/800,294, mailed Nov. 21, 2024, U.S. Patent and Trademark Office, Alexandria, VA. (15 pages).
Office Action (Review Notice) issued Mar. 18, 2025, by the State Intellectual Property Office of People's Republic of China in corresponding Chinese Patent Application No. 202180016167.5 and an English machine translation with Concise Statement of Relevance of Office Action. (15 pages).

* cited by examiner

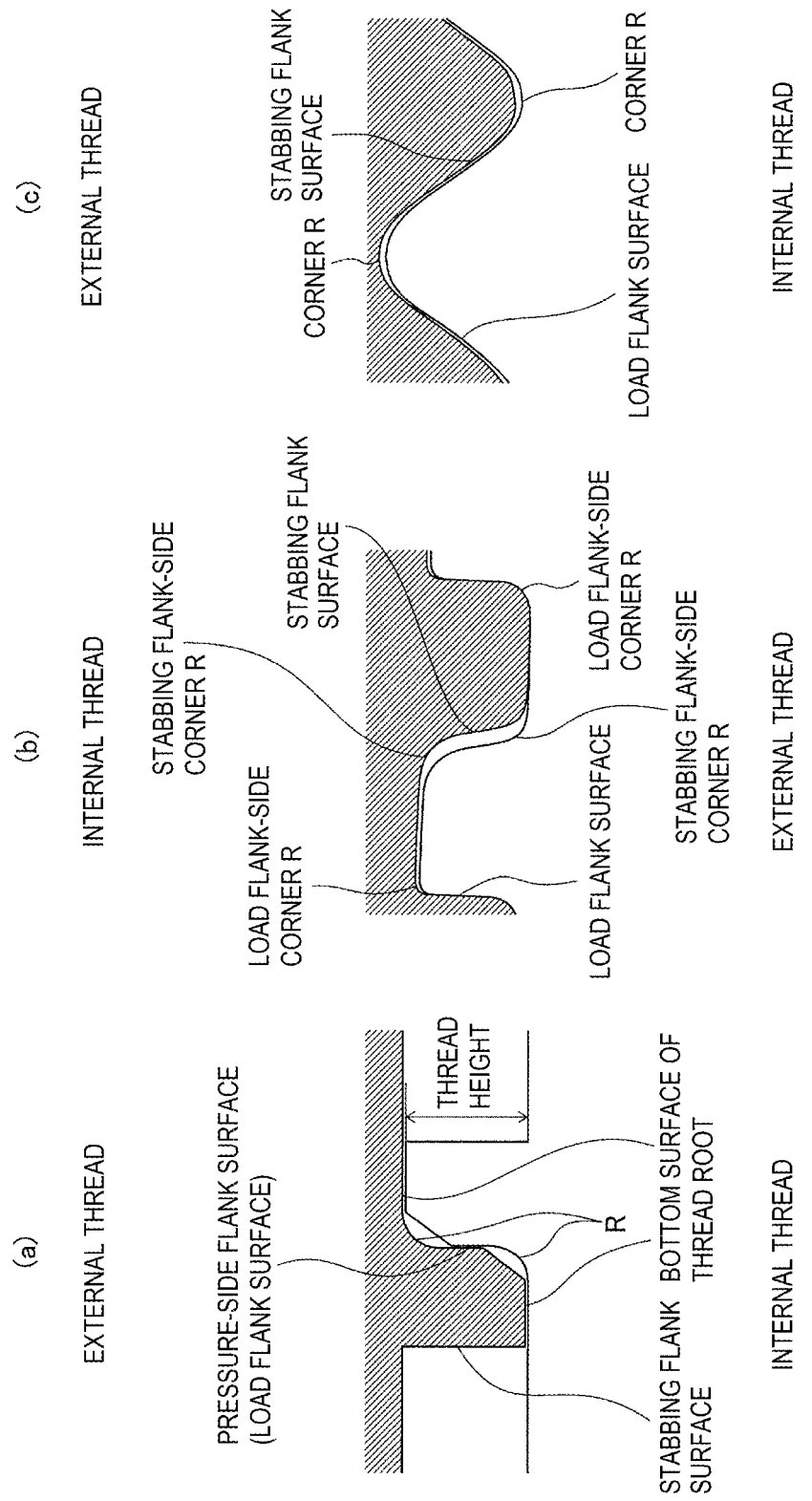

[FIG. 2]
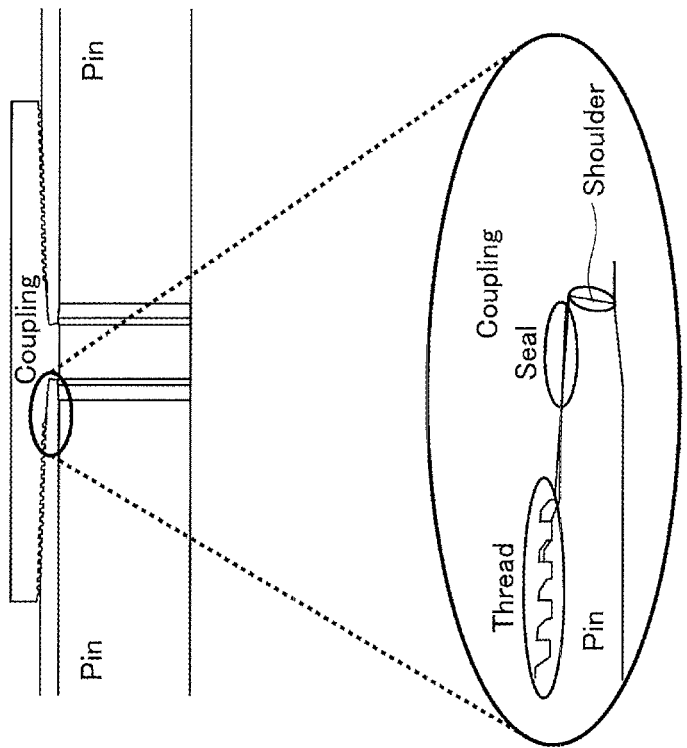
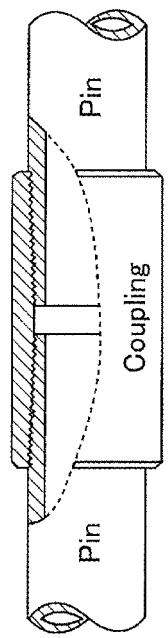

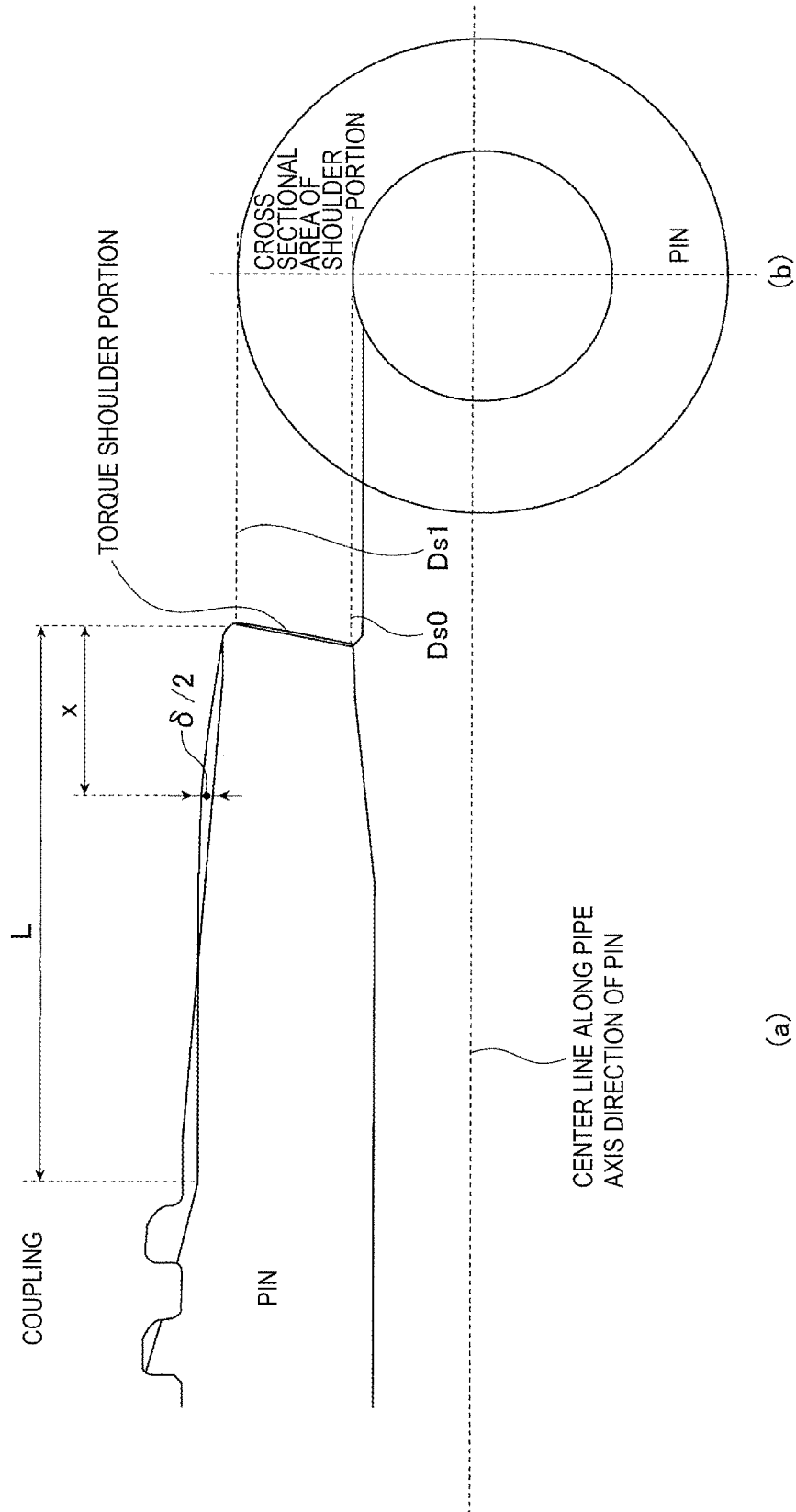
[FIG. 3]

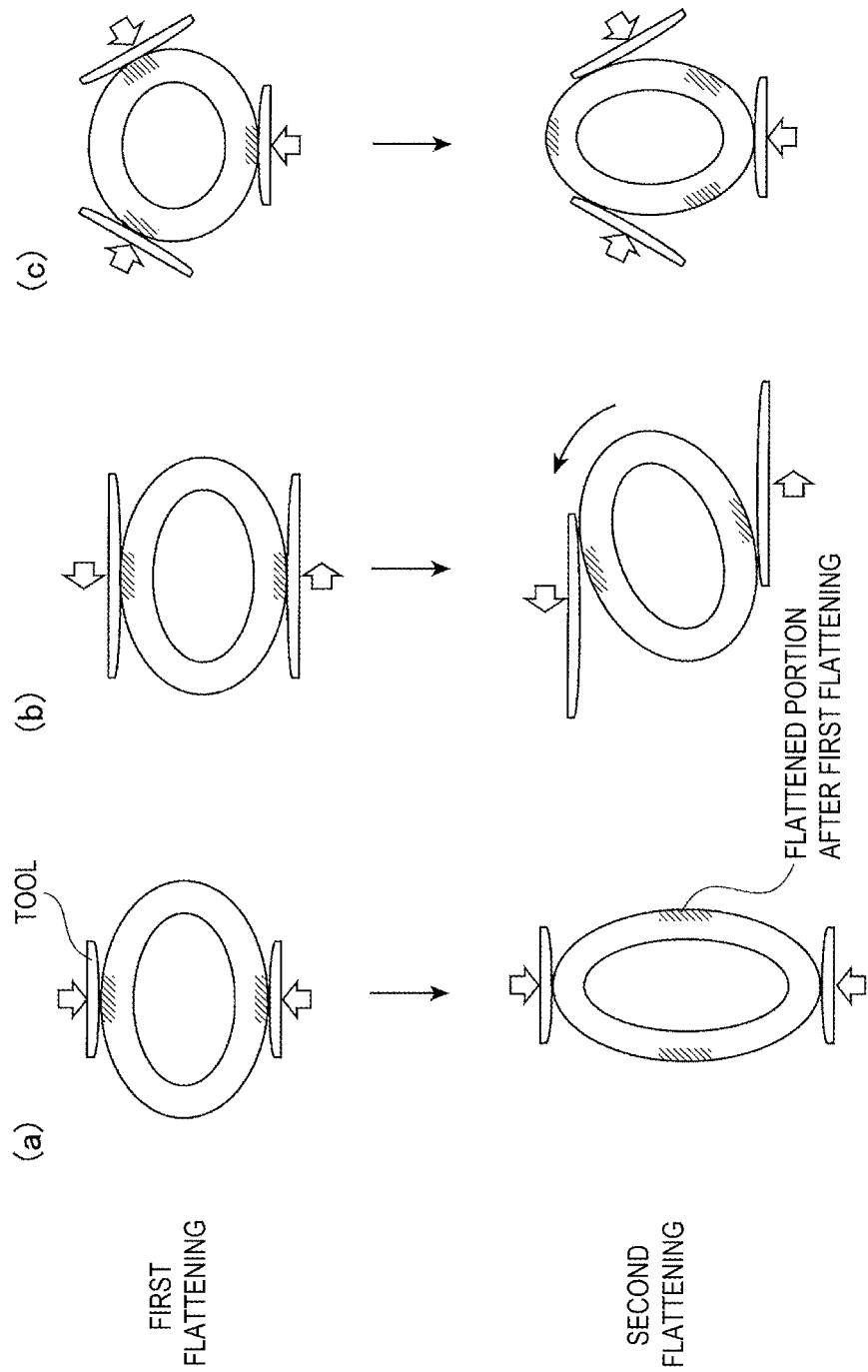

STAINLESS STEEL PIPE AND METHOD FOR MANUFACTURING SAME

CROSS REFERENCE TO RELATED APPLICATIONS

This is the U.S. National Phase application of PCT/JP2021/001884, filed Jan. 20, 2021, which claims priority to Japanese Patent Application No. 2020-031195, filed Feb. 27, 2020, the disclosures of these applications being incorporated herein by reference in their entireties for all purposes.

FIELD OF THE INVENTION

The present invention relates to a stainless steel pipe having excellent corrosion resistance and that, with high axial tensile yield strength and a small difference between its axial tensile yield strength and axial compressive yield strength, can provide a threaded portion having excellent fatigue characteristics. The invention also relates to a method for manufacturing such a stainless steel pipe. Here, high axial tensile yield strength means an axial tensile yield strength of 757 MPa or more, and axial tensile yield strength and axial compressive yield strength having a small difference means that the ratio of axial compressive yield strength to axial tensile yield strength falls within a range of 0.85 to 1.15.

BACKGROUND OF THE INVENTION

With its desirable corrosion resistance performance and high strength characteristics and low-temperature toughness, a duplex stainless steel pipe has been used in a variety of applications, including piping of chemical plants, mining of oil and gas from oil wells and gas wells, and transportation. In recent years, there are attempts to use duplex stainless steel pipes for mining in geothermal power generation, and for heat exchange purposes, and some are already used in these applications. What is important for duplex stainless steel pipes is high strength characteristics that can withstand the deadweight and the high pressure when pipes are joined and used deep underground for mining of resources such as gas and oil, or for extraction of hot water. Another important consideration is corrosion resistance that can withstand the severe corrosive environments of gas, oil, and hot water. Of importance for corrosion resistance is the amount of corrosion resistance improving elements such as Cr, Mo, W, and N, which are added to steel. In this connection, various duplex stainless steels are available, including, for example, SUS329J3L containing 22% Cr, SUS329J4L containing 25% Cr, and ASTM UNS S32750 and S32760 containing increased amounts of Mo.

The most important strength characteristic is the axial tensile yield strength, and a value of axial tensile yield strength represents the specified strength of the product. This is most important because, in mining of resources and extraction of hot water, the pipe needs to withstand the tensile stress due to its own weight when joined and used deep underground. With a sufficiently high axial tensile yield strength against the tensile stress due to its weight, the pipe undergoes less plastic deformation, and this prevents damage to the passive film that is important for keeping the pipe surface corrosion resistant.

While the axial tensile yield strength is most important with regard to the specified strength of the product, the axial compressive yield strength is important for the pipe joint. From the standpoint of preventing fire in pipes used in oil wells and gas well, or allowing for repeated insertion and removal for hydrothermal pumping, pipes used for these applications cannot be joined by welding, and threads are used to make joints. Threads are also used for piping in chemical plants or for transport of resources, in order to reduce the work load for the time-consuming and laborious welding process. Because the joint is retightened and bending deformation occurs at the fastening portion, the thread repeatedly receives axial compressive stress that varies with the fastening force. It is therefore important to provide an axial compressive yield strength that can withstand such compressive stress.

A duplex stainless steel has two phases in its microstructure: the ferrite phase, and the austenite phase which, crystallographically, has low yield strength. In an as-processed form after the hot forming or heat treatment performed in the manufacturing process, a duplex stainless steel cannot provide the strength needed for various applications. In order to provide the necessary strength, various cold rolling techniques are used to improve axial tensile yield strength by dislocation strengthening. The cold rolling techniques intended for duplex stainless steel pipes are limited to cold drawing and cold pilger rolling. In fact, NACE (The National Association of Corrosion Engineers), which provides international standards for use of oil country tubular goods, lists cold drawing and cold pilger rolling as the only definitions of cold rolling. These cold rolling techniques both represent a cold rolling process to achieve longitudinal elongation by reducing the wall thickness and the diameter of a pipe, and dislocation strengthening, induced by strain, acts most effectively for improvement of tensile yield strength along the longitudinal axis of a pipe. In the foregoing cold rolling techniques that longitudinally apply strain along the pipe axis, a strong Bauschinger effect occurs along a pipe axis direction, and the compressive yield strength along the axial direction of pipe is known to show an about 20% decrease. For this reason, it is common practice in designing strength to take the Bauschinger effect into account, and reduce the yield strength at the thread fastening portion, where axial compressive yield strength characteristics are needed. That is, the strength design of thread fastening portion influences the overall product specifications.

PTL 1 addresses this issue by proposing a duplex stainless steel pipe that contains, in mass %, C: 0.008 to 0.03%, Si: 0 to 1%, Mn: 0.1 to 2%, Cr: 20 to 35%, Ni: 3 to 10%, Mo: 0 to 4%, W: 0 to 6%, Cu: 0 to 3%, N: 0.15 to 0.35%, and the balance being iron and impurities, and has a tensile yield strength $YS_{LT}$ of 689.1 to 1000.5 MPa along an axial direction of the duplex stainless steel pipe, and in which the tensile yield strength, $YS_{LT}$, a compressive yield strength, $YS_{LC}$, along the axial direction of the pipe, a tensile yield strength, $YS_{CT}$, along a circumferential direction of the duplex stainless steel pipe, and a compressive yield strength, $YS_{CC}$, along the circumferential direction of the pipe satisfy predetermined formulae.

Fatigue strength is also important for duplex stainless steel pipes. Fatigue fracture occurs when the pipe is repeatedly subjected to stress below the yield stress. A duplex stainless steel pipe breaks under fatigue when placed under the stress produced by bending during construction or by the pressure of a fluid flowing through the pipe. In order to improve fatigue strength, it is therefore important to eliminate areas of concentrated stress, such as surface dents and scratches or coarse inclusions, that become initiation points of fatigue cracking. However, such areas of concentrated stress are unavoidable when threads are used to fasten steel pipes. To describe more specifically, threads are fastened by the pressure that occurs on flank surfaces of external and internal threads. During fastening, a reaction force induces a bending moment at the root of the raised portion forming the flanks of the thread, and this portion of the thread undergoes compressive and tensile stress every time the threads are fastened and released. As an example, in mining of oil and gas from oil wells and gas wells or in extraction of hot water, a steel pipe with threaded joints is rotated into a well, and an eccentricity on the rotational axis bends the steel pipe, including the threaded portion, in a repeated fashion. Here, the stress concentration area at the root of the raised portion in the threaded portion is also repeatedly exerted upon by compressive and tensile stress. Indeed, special consideration is needed against fatigue fracture at the stress concentration area at the root of the raised portion in the threaded portion.

PTL 2 addresses the issue related to the fatigue strength of a threaded portion. The seamless steel pipe for oil country tubular goods disclosed in this related art document is of a stainless steel having a predetermined composition and a predetermined matrix structure. It is stated that the seamless steel pipe has arc surfaces with a curvature radius R of 0.3 mm or more, and that the threaded portion has excellent fatigue strength.

PATENT LITERATURE

PTL 1: Japanese Patent Number 5500324
PTL 2: Japanese Patent Number 6604093

SUMMARY OF THE INVENTION

Because the threaded portion is exerted upon by compressive and tensile stress, a duplex stainless steel pipe has a shorter fatigue life when the compressive yield stress decreases because of the Bauschinger effect produced by conventional cold rolling. A low-temperature heat treatment, such as that disclosed in PTL 1, is effective against decrease of the compressive yield strength of the threaded portion due to the Bauschinger effect. However, in such a low-temperature heat treatment, elements important for corrosion resistance performance precipitate and become consumed in the form of an embrittlement phase containing carbonitrides and nitrogen, and lose their corrosion resistance improving effect. In this case, the duplex stainless steel pipe cannot satisfy corrosion resistance while providing fatigue characteristics for the threaded portion.

The materials of interest to PTL 2 are limited to chemical components that are hardenable by quenching heat treatment, and PTL 2 is not intended for duplex stainless steel pipes requiring dislocation strengthening by cold working. That is, PTL 2 does not take into consideration the problem associated with a duplex stainless steel pipe, specifically, decrease of fatigue characteristics in a threaded portion due to decrease of compressive yield strength by the Bauschinger effect.

Aspects of the present invention have been made under these circumstances, and it is an object according to aspects of the present invention to provide a stainless steel pipe having excellent corrosion resistance and that, with high axial tensile yield strength and a small difference between its axial tensile yield strength and axial compressive yield strength, can provide a threaded portion having excellent fatigue characteristics. Aspects of the invention are also intended to provide a method for manufacturing such a stainless steel pipe.

A duplex stainless steel contains increased solid-solution amounts of Cr and Mo in steel, and forms a highly corrosion-resistant coating, in addition to reducing localized progression of corrosion. In order to protect the material from various forms of corrosion, it is also of importance to bring the fractions of ferrite phase and austenite phase to an appropriate duplex state in the microstructure. The primary corrosion-resistant elements, Cr and Mo, are both ferrite phase-forming elements, and the phase fractions cannot be brought to an appropriate duplex state simply by increasing the contents of these elements. It is accordingly required to add appropriate amounts of austenite phase-forming elements. C, N, Mn, Ni, and Cu are examples of austenite phase-forming elements. Increasing the C content in steel impairs corrosion resistance, and the upper limit of carbon content should be limited. In a duplex stainless steel, the carbon content is typically 0.08% or less. With regard to the other austenite phase-forming elements, nitrogen is frequently used because this element, in the form of a solid solution, is effective for improvement of corrosion resistance and for solid solution strengthening, besides being inexpensive to add.

A duplex stainless steel pipe is subjected to a solid-solution heat treatment performed at a high temperature of at least 1,000° C. following hot forming, in order to form a solid solution of corrosion resistant elements in steel, and to bring the phase fractions to an appropriate duplex state. This is followed by dislocation strengthening by cold rolling to make the steel pipe usable in applications where strength is required. The product, in an as-processed form after the solid-solution heat treatment or cold rolling, shows high corrosion resistance performance with the presence of a solid solution of the elements that effectively provide corrosion resistance, and solid solution strengthening by solid solution nitrogen provides high strength.

As taught in PTL 1, a low-temperature heat treatment is effective when decrease of compressive yield strength at the thread fastening portion due to the Bauschinger effect needs to be mitigated. However, a low-temperature heat treatment causes diffusion of elements that have dissolved in steel in the solid-solution heat treatment. Consequently, elements important for corrosion resistance performance precipitate and become consumed in the form of an embrittlement phase containing carbonitrides and nitrogen, and lose their corrosion resistance improving effect. Here, a possible adverse effect of nitrogen is of concern when this element is intentionally added in large amounts, or when nitrogen is contained in large amounts as a result of melting in the atmosphere or binding to other metallic elements added. Specifically, nitrogen, because of its small atomic size, easily diffuses even in a low-temperature heat treatment, and forms nitrides by binding to surrounding corrosion-resistant elements, with the result that the corrosion-resistant improving effect of these elements is lost. Many of the nitrides formed as a result of precipitation are nitrides of Cr and Mo, which are also corrosion-resistant elements. The precipitates of these elements are large in size, and do not easily disperse and precipitate. Accordingly, the strength improving effect is much smaller than that produced by a solid solution of nitrogen formed in steel. That is, while it is desirable to reduce the N content to reduce a corrosion resistance performance drop, reducing the N content also reduces the effective amount of nitrogen for solid solution strengthening. This may result in decrease of strength after cold rolling following a solid-solution heat treatment, and the high strength needed for mining of oil from wells may not be obtained, particularly when the percentage reduction of cross section ((cross sectional area of raw pipe before cold working−cross sectional area of raw pipe after cold working)/cross sectional area of raw pipe before cold working× 100[%]) is small. There accordingly is a need for a novel technique for improving strength without consuming Cr, Mo, and other corrosion-resistant elements in steel.

The present inventors conducted intensive studies of elements that could improve strength by precipitating and forming fine, dispersed nitrides while reducing a corrosion resistance performance drop by reducing Cr and Mo nitride formation, and found that addition of Ti, Al, V, and Nb, alone or in combination, is effective to this end. The following describes how these elements reduce a corrosion resistance performance drop. Table 1 represents the result of an investigation of temperatures (precipitation temperatures) at which Ti, Al, V, and Nb separately added to a duplex stainless steel (SUS329J4L, 25% Cr stainless steel) form nitrides upon cooling the stainless steel from its melting temperature.

TABLE 1

| Nitrides | Precipitation Temperature (° C.) |
|---|---|
| TiN | 1499 |
| AlN | 1486 |
| VN | 1282 |
| NbN | 1404 |

All of these elements formed nitrides at temperatures higher than the highest nitride-forming temperatures (1,000° C. or less) of corrosion-resistant elements Cr and Mo, making it possible to control consumption of these corrosion-resistant elements by fixing and controlling the amount of solid solution nitrogen before formation of Cr and Mo nitrides takes place. The following describes how high strength is achieved. Ti, Al, V, and Nb, which are added to control the amount of solid solution nitrogen, form nitrides. However, the nitrides of these elements are so refined in size that their precipitates are evenly distributed throughout the steel, and contribute to improving strength by precipitation strengthening (dispersion strengthening). That is, because Cr and Mo nitrides precipitate at relatively lower temperatures, the elements have shorter diffusion distances, and coarsely precipitate more at the grain boundary, where the diffusion rate is high. On the other hand, because Ti, Al, V, and Nb nitrides precipitate at higher temperatures, these elements are able to sufficiently diffuse, and form fine precipitates in a uniform fashion throughout the steel. That is, the present inventors found that, even when a low-temperature heat treatment is performed after cold working, addition of Ti, Al, V, and Nb enables the amount of solid solution nitrogen to be appropriately controlled, and promotes formation of fine precipitates in such a way as to enable control of consumption of corrosion-resistant elements Cr and Mo, and uniform formation of fine precipitates, which are effective for improving strength. That is, a technique is proposed with which the strength of a duplex stainless steel pipe can be improved while maintaining the corrosion resistance performance.

After dedicated studies to find the optimum contents of Ti, Al, V, and Nb, the present inventors found that the foregoing effect can be stably produced when the N content and the contents of Ti, Al, V, and Nb satisfy the following formula (1).

$$0.150 > N - (1.58Ti + 2.70Al + 1.58V + 1.44Nb) \quad (1)$$

In the formula, N, Ti, Al, V, and Nb represent the content of each element in mass %. (The content is 0 (zero) percent for elements that are not contained.)

Axial compressive yield strength is also important for the fatigue strength of a threaded portion. Unavoidably, a threaded portion has areas of concentrated stress. The stress concentration areas of a threaded portion are repeatedly acted upon by axial tensile and compressive stress in a manner that depends on the form of the thread fastening portion or the way the steel pipes with threaded joints are used. Decrease of axial compressive yield stress due to the Bauschinger effect is accompanied by relative decrease of axial compressive yield stress under the stress acting on stress concentration areas, and the fatigue strength decreases. When the stress acting on stress concentration areas exceeds the axial compressive yield stress that has decreased because of the Bauschinger effect, the stress concentration areas undergo plastic deformation, and the fatigue life becomes even shorter. As discussed above, a duplex stainless steel pipe involves decrease of the fatigue characteristics of a threaded portion due to decrease of compressive yield strength by the Bauschinger effect. Faced with this problem, the present inventors conducted intensive studies to find a way of satisfying desired fatigue characteristics at the threaded portion while maintaining the corrosion resistance of a duplex stainless steel pipe. The studies found that a stainless steel pipe that can provide desired fatigue characteristics for the threaded portion while satisfying corrosion resistance can be obtained when the ratio of axial compressive yield strength to axial tensile yield strength is controlled by reducing the difference between axial tensile yield strength and axial compressive yield strength, and when a corner formed by the bottom surface of the thread root and the pressure-side flank surface of the thread at a thread fastening portion has a curvature radius of 0.2 mm or more.

Aspects of the present invention have been made on the basis of these findings, and are as follows.

[1] A stainless steel pipe of a composition that comprises, in mass %, C: 0.005 to 0.08%, Si: 0.01 to 1.0%, Mn: 0.01 to 10.0%, Cr: 20 to 35%, Ni: 1.0 to 15.0%, Mo: 0.5 to 6.0%, and N: 0.150 to less than 0.400%, and one or two or more selected from Ti: 0.0001 to 0.3%, Al: 0.0001 to 0.3%, V: 0.005 to 1.5%, and Nb: 0.005 to less than 1.5%, and in which the balance is Fe and incidental impurities, the composition containing N, Ti, Al, V, and Nb so as to satisfy the following formula (1), $$0.150 > N - (1.58Ti + 2.70Al + 1.58V + 1.44Nb) \quad (1),$$

wherein N, Ti, Al, V, and Nb represent the content of each element in mass % (the content is 0 (zero) percent for elements that are not contained), the stainless steel pipe having an axial tensile yield strength of 757 MPa or more, an axial compressive yield strength/axial tensile yield strength ratio of 0.85 to 1.15, and a microstructure that is 20 to 80% ferrite phase by volume with the remainder containing an austenite phase, the stainless steel pipe having pipe end portions at least one of which has a fastening portion for an external thread or an internal thread, and having a curvature radius of 0.2 mm or more for a corner R formed by a bottom surface of a thread root and a pressure-side flank surface of the thread, measured in an axial plane section of the fastening portion.

[2] The stainless steel pipe according to [1], which has a circumferential compressive yield strength/axial tensile yield strength ratio of 0.85 or more.

[3] The stainless steel pipe according to [1] or [2], wherein the composition further comprises, in mass %, one or two selected from W: 6.0% or less, and Cu: 4.0% or less.

[4] The stainless steel pipe according to any one of [1] to [3], wherein the composition further comprises, in mass %, one or two or more selected from B: 0.010% or less, Zr: 0.10% or less, Ca: 0.010% or less, Ta: 0.3% or less, REM: 0.10% or less, and Mg: 0.10% or less.

[5] The stainless steel pipe according to any one of [1] to [4], wherein the composition further comprises, in mass %, one or two or more selected from Sn: 0.30% or less, Sb: 0.30% or less, and Ag: 0.30% or less.

[6] The stainless steel pipe according to any one of [1] to [5], wherein the stainless steel pipe is a seamless steel pipe.

[7] The stainless steel pipe according to any one of [1] to [6], wherein the corner R has a curvature radius of 0.3 mm or more.

[8] The stainless steel pipe according to [7], wherein the fastening portion has a metal-to-metal seal portion and a torque shoulder portion.

[9] A method for manufacturing a stainless steel pipe of any one of [1] to [8], the method comprising axial drawing followed by a heat treatment performed at a heating temperature of 150 to 600° C., excluding 460 to 480° C.

[10] A method for manufacturing a stainless steel pipe of any one of [1] to [8], the method comprising axial drawing at a work temperature of 150 to 600° C., excluding 460 to 480° C.

[11] The method according to [10], wherein the drawing is followed by a heat treatment performed at a heating temperature of 150 to 600° C., excluding 460 to 480° C.

[12] A method for manufacturing a stainless steel pipe of any one of [1] to [8], the method comprising circumferential bending and unbending.

[13] The method according to [12], wherein the circumferential bending and unbending is performed at a work temperature of 600° C. or less, excluding 460 to 480° C.

[14] The method according to [12] or [13], wherein the bending and unbending is followed by a heat treatment performed at a heating temperature of 150 to 600° C., excluding 460 to 480° C.

Aspects of the present invention can provide a stainless steel pipe having high corrosion resistance performance and that, with high axial tensile yield strength and a small difference between its axial tensile yield strength and axial compressive yield strength, can provide a threaded portion having excellent fatigue characteristics. This makes a stainless steel pipe according to aspects of the present invention usable in severe corrosive environments, and makes it easier to make threaded joints in construction of oil wells and gas wells, in addition to enabling easier design for the thread fastening portion.

BRIEF DESCRIPTION OF THE DRAWINGS

FIG. 1 shows axial cross sectional views of fastening portions of an external thread and an internal thread (cross sectional views parallel to axial direction), with (a) representing a square thread, (b) representing a trapezoidal thread, and (c) representing a triangular thread.

FIG. 2 shows axial cross sectional views of threaded joints (cross sectional views parallel to axial direction), with (a) representing an API threaded joint, and (b) representing a premium joint.

FIG. 3 shows a schematic view near the nose portion, an extension of a pin, with (a) showing a cross sectional view of a pin and a coupling fastening portion taken parallel to pipe axis direction, and (b) showing a torque shoulder portion at the tip of the pin as viewed from the front.

FIG. 4 shows schematic views representing circumferential bending and unbending.

DETAILED DESCRIPTION OF EMBODIMENTS OF THE INVENTION

Embodiments of the present invention are described below.

The reasons for limiting the composition of a steel pipe according to aspects of the present invention are described first. In the following, "%" means "mass %", unless otherwise specifically stated.

C: 0.005 to 0.08%

C is an austenite phase-forming element, and favorably serves to produce appropriate phase fractions when contained in appropriate amounts. However, when contained in excess amounts, C impairs the corrosion resistance by forming carbides. For this reason, the upper limit of C content is 0.08%. The lower limit is not necessarily needed because decrease of austenite phase due to reduced C contents can be compensated by other austenite phase-forming elements. However, the C content is 0.005% or more because excessively low C contents increase the cost of decarburization in melting the material.

Si: 0.01 to 1.0%

Si acts to deoxidize steel, and it is effective to add this element to the molten steel in appropriate amounts. However, any remaining silicon in steel due to excess silicon content impairs workability and low-temperature toughness. For this reason, the upper limit of Si content is 1.0%. The lower limit is 0.01% or more because excessively low Si contents after deoxidation increase manufacturing costs. From the viewpoint of reducing the undesirable effect of remaining excess silicon in steel while producing sufficient levels of deoxidation effect, the Si content is preferably 0.2 to 0.8%.

Mn: 0.01 to 10.0%

Mn is a strong austenite phase-forming element, and is available at lower costs than other austenite phase-forming elements. Unlike C and N, Mn does not consume the corrosion-resistant elements even in a low-temperature heat treatment. Mn is also effective at canceling the effect of impurity element, sulfur, that mixes into the molten steel, and Mn has the effect to fix this element by forming MnS with sulfur, which greatly impairs the corrosion resistance and toughness of steel even when added in trace amounts. From this viewpoint, the Mn content needs to be 0.01% or more. On the other hand, when contained in excessively large amounts, Mn decreases low-temperature toughness. For this reason, the Mn content is 10.0% or less. The Mn content is preferably less than 1.0%, in order not to impair low-temperature toughness. When there is a need to adequately take advantage of Mn as an austenite phase-forming element to achieve cost reduction while taking care not to impair low-temperature toughness, the Mn content is preferably 2.0 to 8.0%.

Cr: 20 to 35%

Cr is the most important element in terms of increasing the strength of the passive film of steel, and improving corrosion resistance performance. The stainless steel pipe, which is used in severe corrosive environments, needs to contain at least 20% Cr. Cr contributes more to the improvement of corrosion resistance with increasing contents. However, with a Cr content of more than 35%, precipitation of embrittlement phase occurs in the process of solidification from the melt. This causes cracking throughout the steel, and makes the subsequent forming process difficult. For this reason, the upper limit is 35%. From the viewpoint of ensuring corrosion resistance and productivity, the Cr content is preferably 22 to 28%.

Ni: 1.0 to 15.0%

Ni is a strong austenite phase-forming element, and improves the low-temperature toughness of steel. It is therefore desirable to make active use of nickel when the use of manganese as an inexpensive austenite phase-forming element is an issue in terms of low-temperature toughness. To this end, the lower limit of Ni content is 1.0%. However, Ni is the most expensive element among the austenite phase-forming elements, and increasing the Ni content increases manufacturing costs. For this reason, the upper limit of Ni content is 15.0%. When the low-temperature toughness is not of concern, it is preferable to use nickel in combination with other elements in an amount of 1.0 to 5.0%. On the other hand, when high low-temperature toughness is needed, it is effective to actively add nickel, preferably in an amount of 5.0 to 13.0%.

Mo: 0.5 to 6.0%

Mo increases the pitting corrosion resistance of steel in proportion to its content. This element is therefore added in amounts that depend on the corrosive environment. However, when Mo is added in excess amounts, precipitation of embrittlement phase occurs in the process of solidification from the melt. This causes large numbers of cracks in the solidification microstructure, and greatly impairs stability in the subsequent forming. For this reason, the upper limit of Mo content is 6.0%. Mo needs to be contained in an amount of 0.5% or more to maintain stable corrosion resistance in a sulfide environment. From the viewpoint of satisfying both the corrosion resistance and production stability needed for the stainless steel pipe, the Mo content is preferably 1.0 to 5.0%.

N: 0.150 to Less Than 0.400%

N is a strong austenite phase-forming element, in addition to being inexpensive. In the form of a solid solution in steel, N is an element that is useful for improving corrosion resistance performance and strength, and is actively used. However, while N itself is inexpensive, excessive addition of nitrogen requires special equipment and time, and increases the manufacturing cost. For this reason, the upper limit of N content is less than 0.400%. The lower limit of N content is 0.150% or more. In accordance with aspects of the present invention, it is necessary to add any one of Ti, Al, V, and Nb, or two or more of these elements in combination. The cooling process after solidification forms fine nitrides of these elements, and produces a strength improving effect. Nitrogen needs to be contained in an amount of 0.150% or more for the lower limit because the strength improving effect tends to become unstable with excessively small N contents. The preferred N content for obtaining a sufficient strength improving effect is 0.155 to 0.320%.

One or Two or More Selected from Ti: 0.0001 to 0.3%, Al: 0.0001 to 0.3%, V: 0.005 to 1.5%, and Nb: 0.005 to Less Than 1.5%

When contained in appropriate amounts, Ti, Al, V, and Nb form fine nitrides in the process of cooling from a dissolved state. This enables the solid-solution amount of nitrogen in steel to be appropriately controlled, in addition to improving strength. In this way, it is possible to reduce the simultaneous decrease of corrosion resistance performance and strength caused when corrosion-resistant elements such as Cr and Mo become consumed in the form of nitrides, and coarsely precipitate. The contents of these elements for obtaining the foregoing effect are Ti: 0.0001% or more, Al: 0.0001% or more, V: 0.005% or more, and Nb: 0.005% or more. Because excessive addition of these elements leads to cost increase and poor formability in hot working, Ti, Al, V, and Nb are contained in amounts of Ti: 0.3% or less, Al: 0.3% or less, V: 1.5% or less, and Nb: less than 1.5%. Aspects of the present invention can achieve both corrosion resistance performance and strength by satisfying the formula (1) below. Excessively large contents of Ti, Al, V, and Nb result in deficiency in the amount of nitrogen to be fixed, and the added elements remain in the steel, with the result that properties such as hot formability become unstable. The preferred contents of Ti, Al, V, and Nb are therefore Ti: 0.0500% or less, Al: 0.150% or less, V: 0.60% or less, and Nb: 0.60% or less. The corrosion resistance and strength can further stabilize when Ti, Al, V, and Nb, added either alone or in combination, fall in the preferred content ranges, and, at the same time, satisfy the formula (1) below.

In accordance with aspects of the present invention, N, Ti, Al, V, and Nb are contained so as to satisfy the following formula (1).

$$0.150 > N - (1.58Ti + 2.70Al + 1.58V + 1.44Nb) \qquad (1)$$

In the formula, N, Ti, Al, V, and Nb represent the content of each element in mass %. (The content is 0 (zero) percent for elements that are not contained.)

Stable corrosion resistance performance and high strength can be achieved by satisfying the formula (1). That is, in accordance with aspects of the present invention, the Ti, Al, V, and Nb contents should be optimized for the amount of nitrogen added to steel. That is, when the contents of these elements are low relative to the N content, it is not possible to sufficiently fix nitrogen and to achieve fine precipitation, with the result that the corrosion resistance performance and strength become unstable. Formula (1) is a formula that optimizes the contents of Ti, Al, V, Nb, which are added either alone or in combination, relative to the amount of nitrogen added. By satisfying formula (1), stable corrosion resistance performance and strength can be obtained.

The balance is Fe and incidental impurities. Examples of the incidental impurities include P: 0.05% or less, S: 0.05% or less, and O: 0.01% or less. P, S, and O are incidental impurities that unavoidably mix into material at the time of refining. When retained in excessively large amounts, these impurity elements cause a range of problems, including decrease of hot workability, and decrease of corrosion resistance and low-temperature toughness. The contents of these elements thus must be confined in the ranges of P: 0.05% or less, S: 0.05% or less, and O: 0.01% or less.

In addition to the foregoing components, the following elements may be appropriately contained in accordance with aspects of the present invention, as needed.

One or Two Selected from W: 6.0% or Less, and Cu: 4.0% or Less W: 6.0% or Less

As is molybdenum, tungsten is an element that increases the pitting corrosion resistance in proportion to its content. However, when contained in excess amounts, tungsten impairs the workability of hot working, and damages production stability. For this reason, tungsten, when contained, is contained in an amount of at most 6.0%. The W content does not particularly require a lower limit. It is, however, preferable to add tungsten in an amount of 0.1% or more, in order to stabilize the corrosion resistance performance of the stainless steel pipe. From the viewpoint of the corrosion resistance and production stability needed for the stainless steel pipe, the W content is more preferably 1.0 to 5.0%.

Cu: 4.0% or Less

Cu is a strong austenite phase-forming element, and improves the corrosion resistance of steel. It is therefore desirable to make active use of Cu when sufficient corrosion resistance cannot be provided by other austenite phase-forming elements, Mn and Ni. On the other hand, when contained in large amounts, Cu leads to decrease of hot workability, and forming becomes difficult. For this reason, Cu, when contained, is contained in an amount of 4.0% or less. The Cu content does not particularly require a lower limit. However, the Cu content is preferably 0.1% or more to obtain the corrosion resistance improving effect. From the viewpoint of satisfying both corrosion resistance and hot workability, the Cu content is more preferably 1.0 to 3.0%.

The following elements may also be appropriately contained in accordance with aspects of the present invention, as needed.

One or Two or More Selected from B: 0.010% or Less, Zr: 0.10% or Less, Ca: 0.010% or Less, Ta: 0.3% or Less, REM: 0.10% or Less, and Mg: 0.10% or Less When added in trace amounts, B, Zr, Ca, REM, and Mg improve bonding at grain boundaries. Trace amounts of these elements alter the form of surface oxides, and improve formability by improving the workability of hot working. As a rule, a duplex stainless steel pipe is not an easily workable material, and often involves roll marks and shape defects that depend on the extent and type of working. B, Zr, Ca, REM, and Mg are effective against forming conditions involving such problems. The contents of these elements do not particularly require lower limits. However, when contained, B, Zr, Ca, REM, and Mg can produce the workability and formability improving effect when the content is 0.0001% or more for each element. When added in large amounts, B, Zr, Ca, REM, and Mg impair the hot workability. Because B, Zr, Ca, REM, and Mg are rare elements, these elements also increase the alloy cost when added in large amounts. For this reason, the upper limit is 0.010% or less for B and Ca, and 0.10% or less for Zr, REM, and Mg. When added in small amounts, Ta reduces transformation into the embrittlement phase, and, at the same time, improves the hot workability and corrosion resistance. Ta is effective when the embrittlement phase persists for extended time periods in a stable temperature region in hot working or in the subsequent cooling process. For this reason, Ta, when contained, is contained in an amount of 0.0001% or more. When adding Ta, the Ta content is 0.3% or less because high Ta contents lead to increased alloy costs.

The following elements may also be appropriately contained in accordance with aspects of the present invention, as needed.

One or Two or More Selected from Sn: 0.30% or Less, Sb: 0.30% or Less, and Ag: 0.30% or Less When contained in trace amounts, Sn, Sb, and Ag improve corrosion resistance performance. The lower limits are not particularly needed for the contents of these elements. However, when contained, these elements can produce the corrosion resistance performance improving effect when the content is 0.0001% or more for each element. Sn, Sb, and Ag decrease hot workability when contained in excessively large amounts. For this reason, when containing these elements, the content is 0.30% or less for Sn, Sb, and Ag.

The following describes the ferrite phase and austenite phase with regard to the appropriate fractions of these two phases, an important factor for corrosion resistance. Aspects of the present invention provide a duplex microstructure that is 20 to 80% ferrite phase by volume with the remainder comprising an austenite phase.

The two phases in the duplex stainless steel act differently on corrosion resistance, and provide high corrosion resistance by being present in a duplex phase in steel. That is, the duplex stainless steel must have both austenite phase and ferrite phase, and the fractions of these two phases are important for corrosion resistance performance. Because aspects of the present invention provide a stainless steel pipe used in applications requiring corrosion resistance performance, it is important for corrosion resistance to provide an appropriate duplex fraction state. In accordance with aspects of the present invention, the appropriate duplex fraction state is a state in which the ferrite fraction in the microstructure of the stainless steel pipe is 20% to 80% by volume. For use in environments requiring even higher corrosion resistance, the ferrite phase is preferably 35 to 65%, in compliance with ISO 15156-3. The remainder is the austenite phase. The volume fraction of ferrite phase is measured after the pipe is made through processes including a solid-solution heat treatment and subsequent cold rolling. For simple measurements and predictions, thermal equilibrium calculations may be performed using the results of chemical component analyses of the steel obtained. Alternatively, the volume fraction of ferrite phase may be found from a comparison of peak values of ferrite phase and austenite phase after an X-ray diffraction analysis performed for small samples cut from the steel pipe produced. The volume fraction of ferrite phase also can be found from the volume fractions of fcc and bcc measured after a crystal orientation analysis.

The axial tensile yield strength at which the highest load occurs is important in grading the strength of a duplex stainless steel pipe intended for oil wells and gas wells and hydrothermal pumping applications requiring axial strength. A stainless steel pipe according to aspects of the present invention has an axial tensile yield strength of 757 MPa or more. As a rule, a duplex stainless steel has a microstructure with the soft, austenite phase. Because of this, the axial tensile yield strength cannot reach 757 MPa in a state after the solid-solution heat treatment. The axial tensile yield strength is therefore adjusted by dislocation strengthening using the cold working described above (axial drawing or circumferential bending and unbending). Higher axial tensile yield strengths are more advantageous in terms of cost because it enables thinner pipe wall design. However, reducing only the wall thickness of a pipe without varying the outer diameter makes the pipe weak against crushing under external pressure, and such pipes cannot be brought to use. For this reason, the axial tensile yield strength is at most 1,033.5 MPa.

In accordance with aspects of the present invention, the ratio of axial compressive yield strength to axial tensile yield strength (axial compressive yield strength/axial tensile yield strength) is 0.85 to 1.15. With an axial compressive yield strength/axial tensile yield strength ratio of 0.85 to 1.15, the pipe is able to withstand higher axial compressive stress occurring during the fastening of threads or when the steel pipe bends in the well. This makes it possible to reduce the wall thickness required to withstand compressive stress. This also improves the fatigue characteristics by providing high yield strength against the tensile compressive stress repeatedly applied to the thread fastening portion. The pipe can have high strength while maintaining corrosion resistance, and the axial compressive yield strength/axial tensile yield strength ratio can be brought to 0.85 to 1.15 when axial drawing is followed by any of a low-temperature heat treatment, warm drawing, and bending and unbending, provided that the essential elements are added. The axial compressive yield strength/axial tensile yield strength ratio can be brought closer to 1, which means a smaller anisotropy, when the pipe is subjected to hot bending and unbending, or when the warm drawing or bending and unbending is followed by a low-temperature heat treatment.

In accordance with aspects of the present invention, the ratio of circumferential compressive yield strength to axial tensile yield strength of pipe is preferably 0.85 or more (circumferential compressive yield strength/axial tensile yield strength). For example, the pipe has a circumferential compressive yield strength/axial tensile yield strength ratio of preferably 0.85 or more, in order to prevent crushing under the external pressure generated in deep oil wells or gas wells, or in deep hydrothermal mining. The effect typically becomes saturated when the circumferential compressive yield strength/axial tensile yield strength ratio is about 1.50, though this does not particularly pose a problem when the circumferential compressive yield strength is larger than the axial tensile yield strength. When the strength ratio is too high, other mechanical characteristics (e.g., low-temperature toughness) along a pipe circumferential direction greatly decrease compared to that in a pipe axis direction. For this reason, the circumferential compressive yield strength/axial tensile yield strength ratio is more preferably 0.85 to 1.25.

In accordance with aspects of the present invention, the aspect ratio of austenite grains separated by a crystal orientation angle difference of 15° or more in an axial wall-thickness cross section is preferably 9 or less. It is also preferable that austenite grains with an aspect ratio of 9 or less have an area fraction of 50% or more. A stainless steel pipe according to aspects of the present invention is adjusted to have an appropriate ferrite phase fraction by heating in a solid-solution heat treatment. Here, inside of the remaining austenite phase is a microstructure having a plurality of crystal grains separated by an orientation angle of 15° or more after the recrystallization occurring during the hot working and heat treatment. This makes the aspect ratio of austenite grains smaller. In this state, the stainless steel pipe does not have the required axial tensile yield strength, and the ratio of axial compressive yield strength to axial tensile yield strength is close to 1. In order to produce the required axial tensile yield strength, the steel pipe is subjected to (1) axial drawing (cold drawing, cold pilger rolling), and (2) circumferential bending and unbending. In these processes, changes occur in the ratio of axial compressive yield strength to axial tensile yield strength, and in the aspect ratio of austenite grains. That is, the aspect ratio of austenite grains, and the ratio of axial compressive yield strength to axial tensile yield strength are closely related to each other. Specifically, while (1) or (2) improves the yield strength in a direction of stretch of austenite grains before and after work in an axial wall-thickness cross section, the yield strength decreases in the opposite direction because of the Bauschinger effect, and this makes the axial compressive yield strength-to-axial tensile yield strength ratio smaller. This means that a steel pipe of small strength anisotropy along the pipe axis can be obtained when austenite grains before and after the process (1) or (2) have a small, controlled, aspect ratio.

In accordance with aspects of the present invention, a stable steel pipe with a small strength anisotropy can be obtained when the austenite grains have an aspect ratio of 9 or less. A stable steel pipe with a small strength anisotropy can also be obtained when austenite grains having an aspect ratio of 9 or less have an area fraction of 50% or more. An even more stable steel pipe with a small strength anisotropy can be obtained when the aspect ratio is 5 or less. Smaller aspect ratios mean smaller strength anisotropies, and, accordingly, the aspect ratio should be brought closer to 1, with no lower limit. The aspect ratio of austenite grains is determined, for example, as a ratio of the longer side and shorter side of a rectangular frame containing grains having a crystal orientation angle of 15° or more observed in the austenite phase in a crystal orientation analysis of an axial wall-thickness cross section. Here, austenite grains of small particle diameters are prone to producing large measurement errors in the aspect ratio, and the presence of such austenite grains of small particle diameters may cause errors in the aspect ratio. It is accordingly preferable that the austenite grain used for aspect ratio measurement be at least 10 µm in terms of a diameter of a true circle of the same area constructed from the measured grain.

In order to stably obtain a microstructure of austenite grains having a small aspect ratio in an axial wall-thickness cross section, it is effective not to stretch the pipe along the pipe axis, and not to reduce the wall thickness in the process (1) or (2). The process (1), in principle, involves drawing along the pipe axis, and reduction of wall thickness. Accordingly, the aspect ratio is larger after work than before work, and this tends to produce strength anisotropy. It is therefore required to maintain a small aspect ratio by reducing the extent of work (the wall thickness reduction is kept at 40% or less, or the axial stretch is kept at 50% or less to reduce stretch in microstructure), and by decreasing the outer circumference of the pipe being stretched to reduce the wall thickness (the outer circumference is reduced at least 10% while stretching the pipe along the pipe axis). It is also required to perform a low-temperature heat treatment after work (softening due to recrystallization or recovery does not occur with a heat-treatment temperature of 600° C. or less) so as to reduce the generated strength anisotropy. The process (2) produces circumferential deformation by bending and unbending, and, accordingly, the aspect ratio basically remains unchanged. This makes the process (2) highly effective at maintaining a small aspect ratio and reducing strength anisotropy, though the process is limited in terms of the amount of shape change that can be attained by stretching or by wall thickness reduction of pipe. This process also does not require the post-work low-temperature heat treatment needed in (1). Austenite grains having an aspect ratio of 9 or less can have an area fraction in a controlled range of 50% or more by controlling the work temperature and the heating conditions of (1) within the ranges according to aspects of the present invention, or by using the process (2).

A heat treatment performed after the process (1) or (2) does not change the aspect ratio. Preferably, the ferrite phase should have smaller aspect ratios for the same reasons described for the austenite phase. However, an austenite phase with a smaller aspect ratio has a smaller yield strength, and its impact on the Bauschinger effect after work is greater.

While the axial tensile yield strength is most important with regard to the specified strength of the product, the axial compressive yield strength is important for the pipe joint. From the standpoint of preventing fire or allowing for repeated insertion and removal, pipes used for oil well and gas wells or for geothermal well applications cannot be joined by welding, and threads are used to make joints.

A threaded joint is constructed from a pin having an external thread, and a box having an internal thread. Aside from the standard threaded joints specified by the API (The American Petroleum Institute), other variations of threaded joints include special types of high-performance threaded joints, called premium joints, that include a metal-to-metal seal portion and a torque shoulder portion, in addition to the threaded portion. In order to make a tight joint, a threaded portion is typically designed so that the contact pressure acts radially on the thread, and, for example, a tapered thread is used for this purpose. The radial contact pressure causes the pin (the internal thread side) to axially elongate by undergoing deformation that reduces the diameter, and the box (external thread side) to axially contract by undergoing deformation that expands the pipe. This creates contact pressure on flank surfaces at the ends of the threaded portions. That is, the thread receives axial compressive stress that varies with the fastening force. It is therefore important to provide axial compressive yield strength that can withstand such compressive stress. In premium joints, a large axial compressive stress generates at torque shoulder portions. Materials having high axial compressive yield strength are therefore also important for preventing plastic deformation of torque shoulder portions.

A stainless steel pipe according to aspects of the present invention is a steel pipe to be joined to another steel pipe either directly or via a coupling. The stainless steel pipe has pipe end portions at least one of which has a fastening portion for an external thread or an internal thread. The stainless steel pipe has a curvature radius of 0.2 mm or more for a corner R formed by the bottom surface of the thread root and a pressure-side flank surface of the thread, measured in an axial plane section of the fastening portion. In accordance with aspects of the present invention, a corner R formed by a flank surface (pressure-side flank surface) and the bottom surface of the thread root has a curvature radius of 0.2 mm or more, regardless of the type of thread. Here, the flank surface is a surface at which the external and internal threads make contact upon fastening, and where pressure is exerted upon by fastening. In this way, the threaded portion can have improved fatigue characteristics.

A stainless steel pipe according to aspects of the present invention has superior compressive resistance, and can be used for threaded joints that are directly joined to other steel pipes (integral joints), or threaded joints that are joined via couplings (T&C joints). In a fastening portion of threads, axial tensile and compressive stress occur as a result of bending deformation during and after fastening. By applying a stainless steel pipe according to aspects of the present invention to threaded joints, aspects of the present invention can achieve a threaded joint that can maintain high corrosion resistance performance and high threaded joint quality.

FIG. 1 shows axial cross sectional views of fastening portions of an external thread and an internal thread (cross sectional views parallel to axial direction), schematically showing thread fastening portions with corners having curvature radius R. FIG. 1(a) represents a square thread. FIG. 1(b) represents a trapezoidal thread. FIG. 1(c) represents a triangular thread. In accordance with aspects of the present invention, an external or internal thread fastening portion is provided at at least one of the pipe end portions, and a corner formed by a flank surface and the bottom surface of the thread root in the fastening portion has a curvature radius of 0.2 mm or more. That is, in accordance with aspects of the present invention, the fatigue characteristics can be improved while maintaining high corrosion resistance performance when a corner R formed by a flank surface and the bottom surface of the thread root has a curvature radius of 0.2 mm or more, regardless of the type of thread. Here, the flank surface is a surface where the external and internal threads make contact upon fastening, and where pressure is exerted upon by fastening. In an external thread (pin), the slant surface of the thread closer to the pipe end is herein called stabbing flank surface, and the slant surface of the thread away from the pipe end is herein called load flank surface. In an internal thread (box), the slant surface of the thread opposite the stabbing flank surface of a pin is herein called stabbing flank surface, and the slant surface of the thread opposite the load flank surface of a pin is herein called load flank surface.

FIG. 2 shows axial cross sectional views of threaded joints (cross sectional views parallel to axial direction). FIG. 2 (a) and FIG. 2(b) represent an API threaded joint and a premium joint, respectively. In a threaded joint configured solely from threaded portions as in the API threaded joint, the maximum contact pressure occurs at the ends of the threaded portions upon fastening of the threads, and the threaded portion on the tip side of the pin makes contact at the stabbing flank surface, whereas the threaded portion on the back side of the pin makes contact at the load flank surface. The reactive force by the torque shoulder portion also needs to be considered in the case of a premium joint. In a premium joint, the maximum contact pressure occurs at the load flank surfaces at the ends of the threaded portions upon fastening of the threads. Conventionally, the axial compressive yield strength is smaller than the axial tensile yield strength because of the Bauschinger effect acting along the pipe axis direction, and, because of the low compressive yield strength, compressive stress generated in areas of concentrated stress easily produces microscopic deformation, and reduces the fatigue life. Techniques are available that perform a low-temperature heat treatment to reduce the Bauschinger effect. However, with a low-temperature heat treatment, high corrosion resistance performance cannot be obtained. That is, corrosion resistance and the fatigue characteristics of threaded portions cannot be improved at the same time. In accordance with aspects of the present invention, because the corner R has a curvature radius of 0.2 mm or more, the stainless steel pipe can have threaded portions with improved fatigue characteristics while providing desirable corrosion resistance performance at the same time.

Providing a curvature radius of more than 0.2 mm for the corner R is effective at further relieving stress concentration. However, a large corner R has the possibility of making the design of threaded portions less flexible, and may impose restriction on the size of steel pipe that can be threaded, if designing is possible at all. Larger corners R also mean smaller flank surface areas of external and internal threads brought into contact with each other. This leads to reduced sealability or reduced fastening force. For these reasons, the corner R is 0.2 mm or more, preferably 0.3 mm or more. Preferably, the corner R is 3.0 mm or less. The area of flank surface, which decreases with increase of the size of corner R, should be defined in relation to the height of the thread crest so that the corner R, with a curvature radius of at least 0.2 mm, accounts for less than 20% of the radial length (a radial length from the center of pipe axis) of the thread height. Because the area of pressure-side flank surface, which decreases with increase of the size of corner R, is affected by the height of the thread, it is desirable that the curvature radius of corner R be 0.3 mm or more, and less than 10% of the thread height in length.

FIG. 3(b) is a schematic view of a premium joint having a metal-to-metal seal portion and a torque shoulder portion, in addition to a threaded portion. The metal-to-metal seal portion (Seal in FIG. 3 (b)) shown in FIG. 3 (b) warrants sealability for the pipe after fastening. The torque shoulder portion (Shoulder in FIG. 3 (b)) serves as a stopper when tightening the pipe, and has an important role in warranting a stable position for the tightened pipe. The torque shoulder portion experiences high compressive stress when tightening the pipe. Deformation of the torque shoulder portion under high compressive stress is problematic because, in this case, the joint is no longer able to provide high sealability, or the inner diameter becomes smaller as a result of inward deformation. To prevent such deformation of torque shoulder portion, the wall thickness needs to be increased to improve compressive strength. In this case, however, design of a thin-walled steel pipe is not possible, or the material will be wasted because of the increased wall thickness.

A typical fastening operation of threads checks the value of applied torque (the value of the torque applied to tighten the thread), and controls the applied torque so that the torque applied beyond the sealing torque (a torque indicating a sealed state reached when the torque applied to tighten the thread exceeds a certain reference value) does not exceed the torque above which the tip of the thread deforms (the tip of the thread deforms when the torque value exceeds a certain reference value or upper limit).

Here, when the pipe has a weak axial compressive yield strength, a lower value needs to be set for the upper limit of torque value provided to prevent deformation of torque shoulder portion. The narrower control range of torque value means that the thread cannot be tightened in a stable fashion. In accordance with aspects of the present invention, the pipe has desirable axial compressive yield strength, and deformation of torque shoulder portion can be prevented while maintaining high corrosion resistance performance. Deformation of torque shoulder portion can be prevented, and the pipe can be tightened in a stable fashion when the thickness cross sectional area of the torque shoulder portion at the tip of an external thread shown in FIG. 3 (the tip of an external thread on the side of a coupling; (Ds1−Ds0)/2) accounts for at least 25% of the cross sectional area of the raw pipe (at least 0.25 in terms of a cross sectional area ratio of the shoulder portion). The percentage is preferably 25 to 60% because the nose becomes too rigid, and galling may occur in tightening the thread when the thickness of the torque shoulder portion at the tip of the external thread is increased. Preferably, the nose portion has design that further increases the strength of the torque shoulder portion against compression because such design can provide improved torque performance (raises the torque value that can be applied without causing deformation, enabling application of a higher fastening torque). FIGS. 3(*a*) and 3(*b*) show schematic views near the nose portion, an extension of a pin. FIG. 3(*a*) is a cross sectional view of a pin and a coupling fastening portion taken parallel to pipe axis direction. FIG. 3(*b*) shows a torque shoulder portion at the tip of the pin as viewed from the front. In order to achieve high torque performance, it is desirable to make the ratio x/L 0.01 to 0.1, where x represents the seal point position from the pipe end, and L is the length of the nose forming an unthreaded portion at the tip of the pin. By providing a seal point position in the vicinity of the shoulder portion, the actual cross sectional area of the shoulder portion (the cross sectional area of shoulder portion: $\pi/4 \times (Ds1^2 - Ds0^2)$) increases, and this provides high torque performance. The nose length is preferably no greater than 0.5 inches because the nose rigidity decreases, and the nose cannot withstand a high compressive force when the nose is too long. Desirably, the nose length is at least 0.2 inches because the pin cannot have enough space for the seal portion when the nose is too short. High torque performance cannot be obtained with traditional stainless steels of low axial compressive yield strength. In FIG. 3, δ represents the amount of seal interference, and is defined by the maximum value of overlaps when drawings are overlaid, Ds1 represents the outer diameter of the shoulder contact area, and Ds0 represent the inner diameter of the shoulder contact area.

Another important characteristic of the threaded portion is sealability, a measure of airtightness. Preferably, the threaded portion satisfies a compression rate of 85% or more in a seal test performed in compliance with ISO 13679:2019. In order to achieve high sealability, it is desirable that the length of the nose forming an unthreaded portion at the tip of the pin be at least 0.3 inches, and that the ratio x/L be 0.2 to 0.5, where x represents the seal point position from the pipe end, and L is the nose length. Desirably, the nose length is at most 1.0 inch because cutting takes time when the nose is unnecessarily long, and an unnecessarily long nose results in unstable performance due to reduced nose rigidity. Conventional duplex stainless steels of low compressive yield strength cannot have long nose design because duplex stainless steels of low compressive yield strength, by itself, cannot tolerate design that involves a thin nose tip.

In view of providing circumferential uniformity for material characteristics and strength characteristics, a stainless steel pipe according to aspects of the present invention is preferably a seamless steel pipe that does not have welded portions or other such seams along the circumference.

The following describes a method for manufacturing a stainless steel pipe according to aspects of the present invention.

First, a steel material of the foregoing duplex stainless steel composition is produced. The process for making the duplex stainless steel may use a variety of melting processes, and is not limited. For example, a vacuum melting furnace or an atmospheric melting furnace may be used when making the steel by electric melting of iron scrap or a mass of various elements. As another example, a bottom-blown decarburization furnace using an Ar—$O_2$ mixed gas, or a vacuum decarburization furnace may be used when using hot metal from a blast furnace. The molten material is solidified by static casting or continuous casting, and formed into ingots or slabs before being hot rolled into a sheet-shaped steel material, or formed into a round billet by forging or rolling.

In the case of a sheet-shaped steel material, the steel material is roughly formed into a pipe shape, and the end portions are welded to form a steel pipe. The steel pipe forming process is not particularly limited, and a steel pipe may be formed by using techniques, for example, such as UOE forming and roll forming, together with welding using filler materials, or electric resistance welding by induction heating. In the case of round billets, the steel material is heated with a heating furnace, and formed into a steel pipe through various seamless steel pipe manufacturing processes. The round billet is formed into a hollow pipe by hot forming (piercing). Various hot forming techniques may be used, including, for example, the Mannesmann process, and the extrusion pipe-making process. It is also possible, as needed, to use, for example, an elongator, an Assel mill, a mandrel mill, a plug mill, a sizer, or a stretch reducer as a hot rolling process that reduces the wall thickness of the hollow pipe, or sets the outer diameter of the hollow pipe.

Desirably, the steel pipe is subjected to a solid-solution heat treatment. A steel pipe formed by bending a sheet-shaped steel material has accumulations of strain due to bending deformation. In hot rolling, a stainless steel pipe undergoes a gradual temperature decrease while being hot rolled from the high-temperature state of heating. A steel pipe formed through various hot rolling processes is typically air cooled after hot forming, and temperature control is not achievable because of the temperature history that varies with the size and type of products. This may lead to decrease of corrosion resistance as a result of the corrosion-resistant elements being consumed in the form of thermochemically stable precipitates that form in various temperature regions in the course of temperature decrease. There is also a possibility of phase transformation into the embrittlement phase, which leads to serious decrease of low-temperature toughness. A duplex stainless steel needs to withstand a variety of corrosive environments, and it is important to bring the fractions of austenite phase and ferrite phase to an appropriate duplex state. Particularly, when the rate of cooling from the heating temperature is not controllable in manufacturing a seamless steel pipe, controlling the fractions of these two phases, which vary in succession, is difficult to achieve. To address these issues, a solid-solution heat treatment is often performed that involves rapid cooling after high-temperature heating to remove the accumulated strain, and to form a solid solution of precipitates in steel, and to initiate reverse transformation of embrittlement phase to non-embrittlement phase, and bring the phase fractions to an appropriate duplex state. This process removes the residual stress due to accumulations of strain, dissolves the precipitates and embrittlement phase into steel, and controls the phase fractions to achieve an appropriate duplex state. The solid-solution heat treatment is typically performed at a high temperature of 1,000° C. or more, though the temperature that dissolves the precipitates, the temperature that initiates reverse transformation of embrittlement phase, and the temperature that brings the phase fractions to an appropriate duplex state slightly vary with the types of elements added. The heating is followed by quenching to maintain the solid-solution state. This may be achieved by compressed-air cooling, or by using various coolants, such as mist, oil, and water.

The steel pipe after the solid-solution heat treatment contains the low-yield-strength austenite phase, and, in its as-processed form, cannot be used for, for example, mining of oil and gas from oil wells and gas wells where high strength is required. This requires strengthening of the pipe by dislocation strengthening, using various cold working techniques. The strength of the stainless steel pipe after strengthening is graded according to its axial tensile yield strength.

In accordance with aspects of the present invention, the pipe is strengthened by using (1) a method that axially stretches the pipe, or (2) a method that involves circumferential bending and unbending of pipe, as follows.

(1) Axial Drawing of Pipe: Cold Drawing, Cold Pilger Rolling

Cold drawing and cold pilger rolling are two methods used for cold rolling of pipes. Both of these techniques can achieve high strength along a pipe axis direction, and can be used as appropriate. These techniques bring changes mostly in rolling reduction and the percentage of outer diameter change until the strength of the required grade is achieved. Another thing to note is that cold drawing and cold pilger rolling are a form of rolling that reduces the outer diameter and wall thickness of pipe to longitudinally stretch and greatly extend the pipe in the same proportion along the pipe axis. Indeed, longitudinal strengthening of pipe along the pipe axis is an easy process. A problem, however, is that these processes produce a large Bauschinger effect in a direction of compression along the pipe axis, and reduces the axial compressive yield strength by as large as about 20% relative to the axial tensile yield strength.

To avoid this, in accordance with aspects of the present invention, a heat treatment is performed at a temperature of 150 to 600° C., excluding 460 to 480° C., after the pipe is stretched along the pipe axis. By adding the essential elements Ti, Al, V, and Nb so as to satisfy formula (1), the nitrides finely precipitated in the steel under high temperature can maintain strength even after the heat treatment. With the controlled amount of solid solution nitrogen, it is also possible to inhibit precipitation of coarse nitrides of corrosion-resistant elements, Cr and Mo, making it possible to reduce decrease of corrosion resistance performance and strength. That is, the corrosion resistance performance can improve as compared to when the essential elements are not contained, and the decrease of axial compressive yield strength due to axial drawing can be reduced while ensuring high strength.

By drawing the pipe along the pipe axis at a drawing temperature of 150 to 600° C. excluding 460 to 480° C., a work load due to softening of the material during work can be reduced, in addition to obtaining the effect of the heat treatment described above.

The upper limits of the drawing temperature and the heating temperature of the heat treatment need to be temperatures that do not dissipate the dislocation strengthening provided by the work, and the applied temperature should not exceed 600° C. Working temperatures of 460 to 480° C. should be avoided because this temperature range coincides with the embrittlement temperature of the ferrite phase, and possibly cause cracking during the process, in addition to causing deterioration of the product characteristics due to embrittlement of pipe.

A rapid yield strength drop occurs when the heating temperature of the heat treatment and the drawing temperature are below 150° C. In order to avoid this and to sufficiently produce the work load reducing effect, these processes are performed at a temperature of 150° C. or more. Preferably, the temperature is 350 to 450° C. to avoid passing the embrittlement phase during heating and cooling.

(2) Circumferential Bending and Unbending of Pipe

Dislocation strengthening involving circumferential bending and unbending of pipe can also be used for strengthening of pipe. This working technique is described below, with reference to the accompanying drawing. Unlike cold drawing and cold pilger rolling that produce a longitudinal strain along a pipe axis direction, the foregoing technique produces strain by bending and flattening of pipe (first flattening), and unbending of pipe that restores full roundness (second flattening), as shown in FIG. 4. In this technique, the amount of strain is adjusted by repeating bending and unbending, or by varying the amount of bend. In either case, the strain imparted is a bending and unbending strain that does not involve a shape change before and after work. The technique also involves hardly any strain along a pipe axis direction, and high strength is achieved by dislocation strengthening due to the strain imparted in the circumference and wall thickness of the pipe. This makes it possible to reduce the Bauschinger effect along a pipe axis direction. That is, unlike cold drawing and cold pilger rolling, the technique does not involve decrease of axial compressive strength, or causes only a small decrease of compressive strength, if any. This makes it possible to more freely design the thread fastening portion. Circumferential bending and unbending cannot produce a large change in outer diameter and wall thickness to the same extent as cold drawing and cold pilger rolling, but is particularly effective when there is a need to reduce the strength anisotropy of circumferential compressive deformation relative to axial tensile deformation.

FIG. 4, (a) and (b) show cross sectional views illustrating a tool with two points of contact. FIG. 4, (c) is a cross sectional view showing a tool with three points of contact. Thick arrows in FIG. 4 indicate the direction of exerted force flattening the steel pipe. As shown in FIG. 4, for second flattening, the tool may be moved or shifted in such a manner as to rotate the steel pipe and make contact with portions of pipe that were not flattened by the first flattening (portions flattened by the first flattening are indicated by shadow shown in FIG. 4).

As illustrated in FIG. 4, the circumferential bending and unbending that flattens the steel pipe, when intermittently or continuously applied throughout the pipe circumference, produces strain in the pipe, with bending strain occurring in portions where the curvature becomes the largest, and unbending strain occurring toward portions where the curvature is the smallest. The strain needed to improve the strength of the steel pipe (dislocation strengthening) accumulates after the deformation due to bending and unbending. Unlike the working that achieves reduced wall thickness and reduced outer diameter by compression, a characteristic feature of the foregoing method is that the pipe is deformed by being flattened, and, because this is achieved without requiring large power, it is possible to minimize the shape change before and after work.

A tool used to flatten the steel pipe, such as that shown in FIG. 4, may have a form of a roll. In this case, two or more rolls may be disposed around the circumference of a steel pipe. Deformation and strain due to repeated bending and unbending can be produced with ease by flattening the pipe and rotating the pipe between the rolls. The rotational axis of the roll may be tilted within 90° of the rotational axis of the pipe. In this way, the steel pipe moves in a direction of its rotational axis while being flattened, and can be continuously worked with ease. When using such rolls for continuous working, for example, the distance between the rolls may be appropriately varied in such a manner as to change the extent of flattening of a moving steel pipe. This makes it easy to vary the curvature (extent of flattening) of the steel pipe in the first and second runs of flattening. That is, by varying the roll gap, the moving path of the neutral line can be changed to uniformly produce strain in a wall thickness direction. The same effect can be obtained when the extent of flattening is varied by varying the roll diameter, instead of roll gap. It is also possible to vary both roll gap and roll diameter. With three or more rolls, the pipe can be prevented from whirling around during work, and this makes the procedure more stable, though the system becomes more complex.

The circumferential bending and unbending of pipe may be performed at ordinary temperature. With the circumferential bending and unbending performed at ordinary temperature, all the nitrogen can turn into a solid solution, and this is preferable from the viewpoint of corrosion resistance. Provided that the essential elements are added, it is effective to increase the work temperature and soften the material when working is not easily achievable because of the high load of cold working. The upper limit of the work temperature needs to be a temperature that does not dissipate the dislocation strengthening provided by the work, and the applied temperature should not exceed 600° C. Work temperatures of 460 to 480° C. should be avoided because this temperature range coincides with the embrittlement temperature of the ferrite phase, and possibly cause cracking during the process, in addition to causing deterioration of the product characteristics due to embrittlement of pipe. The preferred work temperature of circumferential bending and unbending of pipe is therefore 600° C. or less, excluding 460 to 480° C. More preferably, the upper limit of work temperature is 450° C. from a standpoint of saving energy and avoiding passing the embrittlement phase during heating and cooling. Bending and unbending performed at the predetermined work temperatures also has the effect to slightly reduce the strength anisotropy of the pipe after work, and is also effective when the strength anisotropy is of concern.

In accordance with aspects of the present invention, the foregoing method (1) or (2) used for dislocation strengthening may be followed by a further heat treatment. By adding the essential elements so as to satisfy formula (1), the strength can improve through formation of fine precipitates with the elements added, and the amount of solid solution nitrogen can be controlled to prevent decrease of corrosion resistance and strength due to heat treatment. The strength anisotropy can also improve while maintaining these properties. The heating temperature of the heat treatment is preferably 150° C. or more because a heating temperature of less than 150° C. coincides with a temperature region where a rapid decrease of yield strength occurs. The upper limit of the heating temperature needs to be a temperature that does not dissipate the dislocation strengthening provided by the work, and the applied temperature should not exceed 600° C. Heating temperatures of 460 to 480° C. should be avoided because this temperature range coincides with the embrittlement temperature of the ferrite phase, and causes deterioration of the product characteristics due to embrittlement of pipe. It is accordingly preferable that the heat treatment, when performed, be performed at 150 to 600° C., excluding 460 to 480° C. More preferably, the heating temperature is 350 to 450° C. from a standpoint of saving energy and avoiding passing the embrittlement phase during heating and cooling, in addition to producing the anisotropy improving effect. The rate of cooling after heating may be a rate achievable by air cooling or water cooling.

Optionally, the cold working may be followed by a surface treatment such as plating.

In accordance with aspects of the present invention, a stainless steel pipe obtained in the manner described above can be used to make external and internal threads that are designed to have a curvature radius of 0.2 mm or more for a corner R formed by a flank surface and the bottom surface of the thread root, measured in an axial cross section of the threaded joint portion (a cross section parallel to pipe axis direction). The threads can be provided by cutting or rolling, the former being more preferred for stable formation of a corner R. For improved performance as a threaded joint, it is desirable to adopt a premium joint having a metal-to-metal seal portion and a torque shoulder portion, in addition to the threaded portion. A stainless steel seamless pipe according to aspects of the present invention has high axial compressive yield strength, and can exhibit intended functions as a joint when the shoulder portion has a cross sectional area that is at least 25% of the cross sectional area of the raw pipe pin.

For improved high torque performance (raising the torque value that can be applied without causing deformation, enabling application of a higher fastening torque), it is preferable that the nose forming an unthreaded portion at the tip of the pin (FIG. 3) have a length of 0.2 to 0.5 inches, and a ratio x/L of 0.01 to 0.1, where x represents the seal point position from the pipe end, and L is the nose length. In order to provide a metal-to-metal seal portion having high airtightness, it is preferable that the nose forming an unthreaded portion at the tip of the pin have a length of 0.3 to 1.0 inches, and a ratio x/L of 0.2 to 0.5, where x represents the seal point position from the pipe end, and L is the nose length.

A stainless steel pipe according to aspects of the present invention can be produced by using the manufacturing method described above.

Example 1

Aspects of the present invention are further described below through Examples. A duplex stainless steel after the solid-solution heat treatment has uniform characteristics, and the characteristics do not vary greatly whether the steel pipe produced is a steel pipe obtained by forming and welding a sheet-shaped steel material, or a seamless steel pipe produced from a round billet. In the following Examples, the raw pipe subjected to cold working is a seamless steel pipe.

The chemical components represented by A to AK in Table 2 were made into steel with a vacuum melting furnace, and the steel was hot rolled into a round billet having a diameter of 60 mm.

TABLE 2

(mass %)

| Steel type | C | Si | Mn | Cr | Ni | Mo | W | Cu | N | Ti | Al | V | Nb | B, Zr, Ca, Ta, REM, Mg, Sn, Sb, Ag |
|---|---|---|---|---|---|---|---|---|---|---|---|---|---|---|
| A | 0.025 | 0.3 | 0.2 | 22.4 | 5.3 | 2.8 | 0.0 | 0.0 | 0.141 | 0.0000 | 0.0000 | 0.000 | 0.000 | |
| B | 0.025 | 0.3 | 0.2 | 22.4 | 5.0 | 2.8 | 0.0 | 0.0 | 0.158 | 0.0070 | 0.0000 | 0.000 | 0.000 | |
| C | 0.028 | 0.3 | 0.2 | 22.2 | 5.1 | 3.2 | 0.0 | 0.0 | 0.195 | 0.0000 | 0.0250 | 0.000 | 0.000 | |
| D | 0.025 | 0.4 | 0.5 | 22.4 | 5.1 | 3.3 | 0.0 | 0.0 | 0.185 | 0.0000 | 0.0000 | 0.025 | 0.000 | |
| E | 0.022 | 0.1 | 0.2 | 22.3 | 5.3 | 3.2 | 0.0 | 0.0 | 0.192 | 0.0000 | 0.0000 | 0.000 | 0.030 | |
| F | 0.027 | 0.1 | 0.2 | 22.4 | 5.1 | 3.2 | 0.0 | 0.0 | 0.189 | 0.0030 | 0.0210 | 0.000 | 0.000 | |
| G | 0.019 | 0.5 | 0.5 | 22.2 | 4.7 | 3.1 | 0.0 | 0.0 | 0.211 | 0.0030 | 0.0000 | 0.040 | 0.000 | |
| H | 0.018 | 0.8 | 0.5 | 22.4 | 4.9 | 3.1 | 0.0 | 0.0 | 0.194 | 0.0010 | 0.0000 | 0.000 | 0.040 | |
| I | 0.018 | 0.2 | 0.3 | 22.2 | 4.8 | 3.1 | 0.0 | 0.0 | 0.186 | 0.0000 | 0.0200 | 0.030 | 0.000 | |
| J | 0.015 | 0.1 | 0.5 | 22.3 | 5.0 | 3.1 | 0.0 | 0.0 | 0.192 | 0.0000 | 0.0200 | 0.000 | 0.040 | |
| K | 0.019 | 0.7 | 0.5 | 22.4 | 5.1 | 3.4 | 0.0 | 0.0 | 0.222 | 0.0000 | 0.0000 | 0.035 | 0.065 | |
| L | 0.025 | 0.1 | 0.1 | 22.5 | 4.9 | 3.1 | 0.0 | 0.0 | 0.281 | 0.0000 | 0.0700 | 0.000 | 0.000 | |
| M | 0.026 | 0.1 | 0.1 | 22.4 | 5.0 | 3.1 | 0.0 | 0.0 | 0.320 | 0.0000 | 0.0000 | 0.110 | 0.000 | |
| N | 0.022 | 0.1 | 0.2 | 22.4 | 5.1 | 3.2 | 0.0 | 0.0 | 0.330 | 0.0000 | 0.0000 | 0.000 | 0.130 | |
| O | 0.015 | 0.1 | 0.1 | 22.3 | 5.1 | 3.1 | 0.0 | 0.0 | 0.315 | 0.0020 | 0.0250 | 0.040 | 0.040 | |
| P | 0.019 | 0.1 | 0.1 | 22.3 | 5.0 | 3.0 | 1.2 | 0.0 | 0.222 | 0.0010 | 0.0400 | 0.000 | 0.000 | |
| Q | 0.02 | 0.1 | 0.1 | 22.4 | 5.0 | 3.3 | 0.0 | 2.3 | 0.205 | 0.0020 | 0.0300 | 0.000 | 0.000 | |
| R | 0.02 | 0.1 | 0.1 | 22.3 | 5.1 | 3.2 | 1.9 | 1.6 | 0.245 | 0.0020 | 0.0200 | 0.040 | 0.000 | Ca: 0.0008 |
| S | 0.023 | 0.1 | 0.1 | 22.4 | 5.1 | 3.2 | 1.2 | 0.9 | 0.225 | 0.0010 | 0.0300 | 0.020 | 0.000 | Ca: 0.0008, B: 0.003, Sn: 0.16 |
| T | 0.025 | 0.1 | 0.1 | 25.4 | 7.2 | 3.2 | 0.4 | 0.4 | 0.225 | 0.0020 | 0.0400 | 0.000 | 0.000 | |
| U | 0.022 | 0.9 | 0.8 | 25.3 | 7.0 | 3.3 | 0.4 | 0.4 | 0.256 | 0.0010 | 0.0310 | 0.030 | 0.000 | Ca: 0.0008 |
| V | 0.022 | 0.1 | 0.2 | 25.3 | 6.9 | 3.1 | 0.4 | 0.3 | 0.287 | 0.0010 | 0.0200 | 0.030 | 0.040 | B: 0.003 |
| W | 0.02 | 0.1 | 0.2 | 25.4 | 7.0 | 3.1 | 0.4 | 0.3 | 0.288 | 0.0030 | 0.0200 | 0.000 | 0.075 | Ca: 0.0008, B: 0.006, Ta: 0.16, Sb: 0.17 |
| X | 0.021 | 0.1 | 0.2 | 25.3 | 6.9 | 3.3 | 0.4 | 0.4 | 0.291 | 0.0030 | 0.0200 | 0.080 | 0.000 | Ca: 0.0009, B: 0.004, REM: 0.0004, Sn: 0.002 |
| Y | 0.017 | 0.4 | 0.5 | 25.4 | 7.1 | 3.6 | 0.4 | 0.3 | 0.275 | 0.0010 | 0.0100 | 0.040 | 0.030 | Ca: 0.0009, B: 0.004, Zr: 0.003, REM: 0.0005 |
| Z | 0.022 | 0.4 | 0.4 | 25.4 | 7.0 | 3.5 | 0.4 | 0.3 | 0.285 | 0.0010 | 0.0300 | 0.030 | 0.030 | |
| AA | 0.022 | 0.1 | 0.2 | 25.6 | 7.1 | 3.6 | 0.0 | 0.0 | 0.265 | 0.0020 | 0.0300 | 0.030 | 0.010 | |
| AB | 0.021 | 0.1 | 0.2 | 25.4 | 7.0 | 3.3 | 1.5 | 0.6 | 0.288 | 0.0010 | 0.0350 | 0.050 | 0.000 | |
| AC | 0.019 | 0.2 | 0.2 | 25.4 | 6.9 | 3.6 | 0.3 | 1.6 | 0.309 | 0.0010 | 0.0300 | 0.070 | 0.000 | |
| AD | 0.022 | 0.1 | 8.9 | 25.1 | 1.8 | 1.2 | 0.0 | 0.0 | 0.202 | 0.0010 | 0.0300 | 0.000 | 0.000 | Ca: 0.007, B: 0.008, Sb: 0.002, Mg: 0.011, Ag: 0.011 |
| AE | 0.019 | 0.1 | 0.2 | 22.1 | 5.0 | 2.9 | 0.0 | 0.0 | 0.159 | 0.0000 | 0.0000 | 0.000 | 0.000 | |
| AF | 0.021 | 0.1 | 0.2 | 25.3 | 6.9 | 3.1 | 0.4 | 0.4 | 0.211 | 0.0030 | 0.0200 | 0.000 | 0.000 | |
| AG | 0.022 | 0.1 | 0.1 | 22.1 | 6.9 | 3.1 | 1.3 | 0.0 | 0.201 | 0.0020 | 0.0100 | 0.010 | 0.000 | |
| AH | 0.030 | 0.4 | 0.3 | 19.4 | 3.0 | 1.1 | 0.0 | 0.0 | 0.164 | 0.0030 | 0.0080 | 0.000 | 0.000 | |
| AI | 0.019 | 0.3 | 0.4 | 26.8 | 0.3 | 1.8 | 0.0 | 0.0 | 0.161 | 0.0020 | 0.0000 | 0.010 | 0.000 | |
| AJ | 0.096 | 0.1 | 0.1 | 22.4 | 4.2 | 2.5 | 0.0 | 0.6 | 0.158 | 0.0000 | 0.0000 | 0.005 | 0.010 | |
| AK | 0.018 | 0.4 | 0.4 | 25.4 | 3.7 | 0.3 | 0.0 | 0.6 | 0.191 | 0.0010 | 0.0080 | 0.020 | 0.010 | |

(mass %)

| Steel type | Formula (1) satisfied or unsatisfied | Right-hand side of formula (1) | Microstructure | Remarks |
|---|---|---|---|---|
| A | ○ | 0.141 | Ferrite-austenite phase | Comparative Example |
| B | ○ | 0.147 | Ferrite-austenite phase | Present Example |
| C | ○ | 0.148 | Ferrite-austenite phase | Present Example |
| D | ○ | 0.146 | Ferrite-austenite phase | Present Example |
| E | ○ | 0.149 | Ferrite-austenite phase | Present Example |
| F | ○ | 0.144 | Ferrite-austenite phase | Present Example |
| G | ○ | 0.143 | Ferrite-austenite phase | Present Example |
| H | ○ | 0.135 | Ferrite-austenite phase | Present Example |
| I | ○ | 0.101 | Ferrite-austenite phase | Present Example |
| J | ○ | 0.096 | Ferrite-austenite phase | Present Example |
| K | ○ | 0.073 | Ferrite-austenite phase | Present Example |
| L | ○ | 0.148 | Ferrite-austenite phase | Present Example |
| M | ○ | 0.146 | Ferrite-austenite phase | Present Example |
| N | ○ | 0.143 | Ferrite-austenite phase | Present Example |
| O | ○ | 0.144 | Ferrite-austenite phase | Present Example |
| P | ○ | 0.144 | Ferrite-austenite phase | Present Example |
| Q | ○ | 0.146 | Ferrite-austenite phase | Present Example |

TABLE 2-continued

| | | | | |
|---|---|---|---|---|
| R | ○ | 0.141 | Ferrite-austenite phase | Present Example |
| S | ○ | 0.135 | Ferrite-austenite phase | Present Example |
| T | ○ | 0.146 | Ferrite-austenite phase | Present Example |
| U | ○ | 0.148 | Ferrite-austenite phase | Present Example |
| V | ○ | 0.142 | Ferrite-austenite phase | Present Example |
| W | ○ | 0.137 | Ferrite-austenite phase | Present Example |
| X | ○ | 0.122 | Ferrite-austenite phase | Present Example |
| Y | ○ | 0.148 | Ferrite-austenite phase | Present Example |
| Z | ○ | 0.136 | Ferrite-austenite phase | Present Example |
| AA | ○ | 0.143 | Ferrite-austenite phase | Present Example |
| AB | ○ | 0.141 | Ferrite-austenite phase | Present Example |
| AC | ○ | 0.140 | Ferrite-austenite phase | Present Example |
| AD | ○ | 0.143 | Ferrite-austenite phase | Present Example |
| AE | x | 0.159 | Ferrite-austenite phase | Comparative Example |
| AF | x | 0.168 | Ferrite-austenite phase | Comparative Example |
| AG | x | 0.163 | Ferrite-austenite phase | Comparative Example |
| AH | ○ | 0.144 | Ferrite-austenite phase | Comparative Example |
| AI | ○ | 0.142 | <u>Ferrite phase</u> | Comparative Example |
| AJ | ○ | 0.136 | Ferrite-austenite phase | Comparative Example |
| AK | ○ | 0.128 | Ferrite-austenite phase | Comparative Example |

Formula (1): $0.150 > N - (1.58Ti + 2.70Al + 1.58 V + 1.44Nb)$;
○: Formula (1) is satisfied:
x: Formula (1) is not satisfied
underline means outside of the range of the present invention.

After hot rolling, the round billet was recharged into the heating furnace, and was held at a high temperature of 1,200° C. or more. The material was then hot formed into a raw seamless pipe having an outer diameter of 70 mm, and an inner diameter of 58 mm (wall thickness=6 mm), using a Mannesmann piercing rolling mill. After hot forming, the raw pipes of different compositions were each subjected to a solid-solution heat treatment at a temperature that brings the fractions of ferrite phase and austenite phase to an appropriate duplex state. This was followed by strengthening. This was achieved by drawing rolling, a type of axial drawing technique, and bending and unbending, as shown in Table 3. After drawing rolling or bending and unbending, a part of pipe was cut out, and the crystal orientation was analyzed for a 1.5-mm² measurement area to find the proportion of bcc (ferrite phase) relative to the whole microstructure, and confirm that the microstructure has an appropriate duplex fraction state of ferrite phase and austenite phase.

The sample was then subjected to an EBSD crystal orientation analysis that observed the wall thickness of pipe in a cross section taken parallel to the pipe axis, and austenite grains separated by a crystal orientation angle of 15° were measured for aspect ratio. The measurement was made over a 1.2 mm×1.2 mm area, and the aspect ratio was measured for austenite grains that had a grain size of 10 μm or more in terms of a diameter of an imaginary true circle.

The drawing rolling was performed under the conditions that reduce the wall thickness by 3 to 20%, and the outer circumference by 3 to 20%. For bending and unbending, a rolling mill was prepared that had three cylindrical rolls disposed at a pitch of 120° around the outer circumference of pipe (FIG. 4, (c)). The pipe was processed by being rotated with the rolls rolling around the outer circumference of pipe with a roll gap smaller than the outer diameter of the pipe by 10 to 15%. In selected conditions, the pipes were subjected to warm working at 300 to 630° C. In selected conditions, the pipes after cold working and warm working were subjected to a low-temperature heat treatment at 300 to 630° C.

The steel pipes were measured for axial tensile yield strength and axial compressive yield strength along the length of pipe, and for circumferential compressive yield strength. The steel pipes were also measured for axial tensile yield strength, on which grading of steel pipes intended for oil wells and gas wells is based. As an evaluation of strength anisotropy, the steel pipes were measured for a ratio of axial compressive yield strength to axial tensile yield strength, and a ratio of circumferential compressive yield strength to axial tensile yield strength.

The steel pipes were also subjected to a stress corrosion test in a chloride-sulfide environment. The corrosive environment was created by preparing an aqueous solution that simulates a mining environment encountered by oil country tubular goods (a 20% NaCl+0.5% $CH_3COOH+CH_3COONa$ aqueous solution with added $H_2S$ gas under a pressure of 0.01 to 0.10 MPa; an adjusted pH of 3.0; test temperature=25° C.). In order to be able to longitudinally apply stress along the pipe axis, a 4-point bending test piece with a wall thickness of 5 mm was cut out, and a stress 90% of the axial tensile yield strength of pipe was applied before dipping the test piece in the corrosive solution. For evaluation of corrosion, samples were evaluated as satisfactory (indicated by "O") when no crack was observed in the stressed surface immediately after the sample dipped in the corrosive aqueous solution for 720 hours under applied stress was taken out of the solution. Samples that did not break but had cracks are indicated by "Crack". Samples that broke after propagation of cracks are indicated by "Break".

As another test, the stainless steel pipe was machined to form square threaded portions at the pipe end portions, and two of the threaded steel pipes were joined by fastening the threads. The threaded portion was then subjected to a fatigue test in which the pipe ends were rotated with 3 to 10% eccentricity, according to the axial tensile yield strength of steel pipe. Separately, the stainless steel pipe was machined to form trapezoidal and triangular threaded portions at the pipe end portions, and two of the threaded steel pipes were joined by fastening the threads, either directly or via a coupling. The threaded portion was then subjected to a fatigue test in which the pipe ends were rotated with 3 to 10% eccentricity, according to the axial tensile yield strength of steel pipe. The steel pipes were also tested for fatigue cracks at stress concentration areas, and for the presence or absence of a fracture at the threads due to propagation of fatigue cracks. The test was conducted by varying the curvature radius R of a corner formed by the load flank surface and stabbing flank surface at the bottom of the thread of a pin, specifically, an area of threaded portion where the stress concentrates. The value of curvature radius R was also varied by the same amounts for a corner formed by the load flank surface and stabbing flank surface at the bottom of the thread of a coupling. Steel pipes that did not have fatigue cracks were evaluated as satisfactory (indicted by "○"). Steel pipes that did not break but had fatigue cracks at corners R are indicted by "Crack". Steel pipes that had broken threads are indicated by "Break".

Table 3 shows the manufacturing conditions, along with the results of evaluations. Here, the method of working, number of runs (passes), and work temperature are the conditions of the processes performed to improve strength after the heat treatment of a hot-rolled steel pipe, specifically, draw rolling, and bending and unbending.

TABLE 3

| No. | Steel type | Work method | Number of runs Passes | Work temp. ° C. | Heat treatment temp. ° C. | Axial tensile yield strength MPa | Curvature radius of corner R mm | Aspect ratio | Volume fraction of ferrite % | Axial compressive yield strength/ axial tensile yield strength |
|---|---|---|---|---|---|---|---|---|---|---|
| 1 | A | Draw rolling | 1 | Ordinary temp. | — | 739 | 0.4 | 6.5 | 51 | 0.82 |
| 2 | A | Draw rolling | 1 | Ordinary temp. | 450 | 735 | 0.4 | 6.5 | 51 | 0.87 |
| 3 | A | Bending and unbending | 1 | Ordinary temp. | — | 747 | 0.4 | 4.5 | 51 | 1.01 |
| 4 | A | Bending and unbending | 1 | Ordinary temp. | 450 | 747 | 0.4 | 4.4 | 51 | 1.01 |
| 5 | B | Draw rolling | 1 | Ordinary temp. | — | 759 | 0.3 | 8.8 | 55 | 0.81 |
| 6 | B | Bending and unbending | 1 | Ordinary temp. | — | 762 | 0.3 | 3.9 | 55 | 1.03 |
| 7 | C | Draw rolling | 1 | Ordinary temp. | 380 | 768 | 0.4 | 8.9 | 48 | 0.87 |
| 8 | C | Bending and unbending | 1 | Ordinary temp. | — | 769 | 0.3 | 3.6 | 48 | 1.03 |
| 9 | D | Draw rolling | 1 | 400 | — | 779 | 0.1 | 6.5 | 46 | 0.86 |
| 10 | D | Bending and unbending | 1 | Ordinary temp. | — | 781 | 0.1 | 3.5 | 46 | 1.04 |
| 11 | D | Draw rolling | 1 | 400 | — | 779 | 0.3 | 6.5 | 46 | 0.86 |
| 12 | D | Bending and unbending | 1 | Ordinary temp. | — | 781 | 0.3 | 3.5 | 46 | 1.04 |
| 13 | E | Draw rolling | 1 | Ordinary temp. | — | 781 | 0.5 | 9.1 | 45 | 0.79 |
| 14 | E | Draw rolling | 1 | Ordinary temp. | 350 | 775 | 0.5 | 8.4 | 45 | 0.86 |
| 15 | E | Bending and unbending | 1 | Ordinary temp. | — | 783 | 0.3 | 2.3 | 45 | 1.03 |
| 16 | F | Bending and unbending | 1 | Ordinary temp. | — | 791 | 0.3 | 1.9 | 43 | 1.03 |
| 17 | F | Bending and unbending | 1 | Ordinary temp. | 350 | 795 | 0.3 | 1.9 | 43 | 1.02 |
| 18 | G | Bending and unbending | 1 | 300 | — | 828 | 0.4 | 3.5 | 43 | 1.02 |
| 19 | G | Bending and unbending | 1 | Ordinary temp. | 350 | 833 | 0.4 | 3.5 | 43 | 1.02 |
| 20 | H | Bending and unbending | 1 | Ordinary temp. | — | 861 | 0.3 | 3.2 | 41 | 1.02 |
| 21 | I | Bending and unbending | 1 | Ordinary temp. | — | 866 | 0.3 | 2.9 | 41 | 1.02 |
| 22 | J | Bending and unbending | 1 | Ordinary temp. | — | 879 | 0.3 | 2.7 | 39 | 1.05 |
| 23 | K | Bending and unbending | 2 | Ordinary temp. | — | 884 | 0.3 | 2.4 | 38 | 1.05 |
| 24 | L | Bending and unbending | 1 | Ordinary temp. | — | 798 | 0.3 | 3.3 | 37 | 1.04 |
| 25 | M | Bending and unbending | 2 | Ordinary temp. | — | 877 | 0.3 | 3.3 | 35 | 1.01 |
| 26 | N | Bending and unbending | 1 | Ordinary temp. | — | 876 | 0.3 | 2.9 | 36 | 1.03 |
| 27 | O | Bending and unbending | 2 | Ordinary temp. | — | 894 | 0.3 | 2.5 | 39 | 1.03 |
| 28 | O | Bending and unbending | 2 | Ordinary temp. | 300 | 890 | 0.4 | 2.3 | 39 | 1.02 |
| 29 | P | Bending and unbending | 1 | Ordinary temp. | — | 800 | 0.3 | 3.7 | 39 | 1.02 |
| 30 | Q | Bending and unbending | 1 | Ordinary temp. | — | 805 | 0.3 | 3.6 | 34 | 1.02 |
| 31 | Q | Bending and unbending | 2 | 450 | 300 | 865 | 0.5 | 3.8 | 34 | 1.03 |
| 32 | R | Bending and unbending | 2 | Ordinary temp. | — | 891 | 0.3 | 4.0 | 34 | 1.02 |
| 33 | S | Bending and unbending | 2 | Ordinary temp. | — | 870 | 0.3 | 4.2 | 37 | 1.02 |
| 34 | T | Bending and unbending | 2 | Ordinary temp. | — | 865 | 0.3 | 4.8 | 55 | 1.07 |
| 35 | U | Draw rolling | 1 | Ordinary temp. | — | 875 | 0.3 | 9.9 | 50 | 0.83 |
| 36 | U | Bending and unbending | 1 | Ordinary temp. | — | 878 | 0.3 | 3.3 | 50 | 1.08 |
| 37 | U | Bending and unbending | 1 | Ordinary temp. | 450 | 935 | 0.4 | 3.3 | 50 | 1.04 |
| 38 | V | Bending and unbending | 2 | Ordinary temp. | — | 899 | 0.3 | 2.5 | 48 | 1.06 |
| 39 | W | Bending and unbending | 1 | Ordinary temp. | — | 922 | 0.3 | 2.5 | 49 | 1.07 |
| 40 | X | Bending and unbending | 2 | Ordinary temp. | — | 901 | 0.3 | 2.9 | 48 | 1.06 |
| 41 | Y | Bending and unbending | 1 | Ordinary temp. | — | 889 | 0.3 | 3.1 | 47 | 1.04 |
| 42 | Z | Bending and unbending | 1 | Ordinary temp. | — | 877 | 0.3 | 3.7 | 58 | 1.05 |
| 43 | AA | Bending and unbending | 1 | Ordinary temp. | — | 877 | 0.3 | 3.9 | 50 | 1.09 |
| 44 | AA | Draw rolling | 1 | 630 | — | 681 | 0.5 | 8.9 | 50 | 1.06 |
| 45 | AB | Bending and unbending | 1 | Ordinary temp. | — | 881 | 0.3 | 3.9 | 50 | 1.03 |
| 46 | AC | Bending and unbending | 1 | Ordinary temp. | 450 | 966 | 0.4 | 3.9 | 45 | 1.03 |
| 47 | AC | Draw rolling | 1 | Ordinary temp. | 630 | 693 | 0.5 | 9.4 | 45 | 1.04 |
| 48 | AD | Bending and unbending | 1 | Ordinary temp. | — | 878 | 0.3 | 1.3 | 38 | 1.02 |
| 49 | AE | Bending and unbending | 1 | Ordinary temp. | 350 | 789 | 0.3 | 4.1 | 58 | 1.02 |
| 50 | AE | Draw rolling | 1 | Ordinary temp. | 450 | 788 | 0.5 | 9.8 | 58 | 0.86 |
| 51 | AF | Bending and unbending | 1 | Ordinary temp. | 350 | 788 | 0.3 | 4.1 | 55 | 1.01 |
| 52 | AF | Draw rolling | 1 | 450 | 350 | 791 | 0.5 | 9.8 | 55 | 0.86 |
| 53 | AG | Bending and unbending | 1 | 350 | 350 | 759 | 0.3 | 3.7 | 60 | 1.01 |
| 54 | AG | Draw rolling | 1 | Ordinary temp. | 430 | 781 | 0.5 | 8.1 | 60 | 0.86 |
| 55 | AH | Bending and unbending | 1 | Ordinary temp. | — | 780 | 0.3 | 3.1 | 30 | 0.98 |
| 56 | AI | Bending and unbending | 1 | Ordinary temp. | — | 561 | 0.5 | x* | 100 | 0.99 |
| 57 | AJ | Bending and unbending | 1 | Ordinary temp. | — | 788 | 0.3 | 4.3 | 40 | 0.98 |
| 58 | AK | Bending and unbending | 1 | Ordinary temp. | — | 841 | 0.3 | 3.6 | 55 | 0.92 |

TABLE 3-continued

| No. | Circumferential compressive yield strength MPa | Circumferential compressive yield strength/ axial tensile yield strength | Corrosion test | Fatigue test | | | Remarks |
|---|---|---|---|---|---|---|---|
| | | | | Square thread | Trapezoidal thread | Triangular thread | |
| 1 | 746 | 1.01 | ○ | Break | Break | Break | Comparative Example |
| 2 | 743 | 1.01 | ○ | Break | Break | Break | Comparative Example |
| 3 | 755 | 1.01 | ○ | Crack | Crack | Crack | Comparative Example |
| 4 | 754 | 1.01 | ○ | Crack | Crack | Crack | Comparative Example |
| 5 | 767 | 1.01 | ○ | Break | Break | Break | Comparative Example |
| 6 | 776 | 1.02 | ○ | ○ | ○ | ○ | Present Example |
| 7 | 775 | 1.01 | ○ | ○ | ○ | ○ | Present Example |
| 8 | 781 | 1.02 | ○ | ○ | ○ | ○ | Present Example |
| 9 | 788 | 1.01 | ○ | Break | Break | Break | Comparative Example |
| 10 | 791 | 1.01 | ○ | Crack | Crack | Crack | Comparative Example |
| 11 | 788 | 1.01 | ○ | ○ | ○ | ○ | Present Example |
| 12 | 791 | 1.01 | ○ | ○ | ○ | ○ | Present Example |
| 13 | 788 | 1.01 | ○ | Break | Break | Break | Comparative Example |
| 14 | 788 | 1.02 | ○ | ○ | ○ | ○ | Present Example |
| 15 | 789 | 1.01 | ○ | ○ | ○ | ○ | Present Example |
| 16 | 796 | 1.01 | ○ | ○ | ○ | ○ | Present Example |
| 17 | 800 | 1.01 | ○ | ○ | ○ | ○ | Present Example |
| 18 | 837 | 1.01 | ○ | ○ | ○ | ○ | Present Example |
| 19 | 843 | 1.01 | ○ | ○ | ○ | ○ | Present Example |
| 20 | 883 | 1.03 | ○ | ○ | ○ | ○ | Present Example |
| 21 | 889 | 1.03 | ○ | ○ | ○ | ○ | Present Example |
| 22 | 896 | 1.02 | ○ | ○ | ○ | ○ | Present Example |
| 23 | 911 | 1.03 | ○ | ○ | ○ | ○ | Present Example |
| 24 | 836 | 1.05 | ○ | ○ | ○ | ○ | Present Example |
| 25 | 888 | 1.01 | ○ | ○ | ○ | ○ | Present Example |
| 26 | 901 | 1.03 | ○ | ○ | ○ | ○ | Present Example |
| 27 | 911 | 1.03 | ○ | ○ | ○ | ○ | Present Example |
| 28 | 921 | 1.03 | ○ | ○ | ○ | ○ | Present Example |
| 29 | 819 | 1.02 | ○ | ○ | ○ | ○ | Present Example |
| 30 | 825 | 1.02 | ○ | ○ | ○ | ○ | Present Example |
| 31 | 888 | 1.03 | ○ | ○ | ○ | ○ | Present Example |
| 32 | 900 | 1.01 | ○ | ○ | ○ | ○ | Present Example |
| 33 | 880 | 1.01 | ○ | ○ | ○ | ○ | Present Example |
| 34 | 891 | 1.03 | ○ | ○ | ○ | ○ | Present Example |
| 35 | 898 | 1.03 | ○ | Break | Break | Break | Comparative Example |
| 36 | 899 | 1.02 | ○ | ○ | ○ | ○ | Present Example |
| 37 | 941 | 1.01 | ○ | ○ | ○ | ○ | Present Example |
| 38 | 931 | 1.04 | ○ | ○ | ○ | ○ | Present Example |
| 39 | 951 | 1.03 | ○ | ○ | ○ | ○ | Present Example |
| 40 | 911 | 1.01 | ○ | ○ | ○ | ○ | Present Example |
| 41 | 902 | 1.01 | ○ | ○ | ○ | ○ | Present Example |
| 42 | 895 | 1.02 | ○ | ○ | ○ | ○ | Present Example |
| 43 | 881 | 1.00 | ○ | ○ | ○ | ○ | Present Example |
| 44 | 695 | 1.02 | ○ | Break | Break | Break | Comparative Example |
| 45 | 891 | 1.01 | ○ | ○ | ○ | ○ | Present Example |
| 46 | 991 | 1.03 | ○ | ○ | ○ | ○ | Present Example |
| 47 | 711 | 1.03 | ○ | Break | Break | Break | Comparative Example |
| 48 | 896 | 1.02 | ○ | ○ | ○ | ○ | Present Example |
| 49 | 789 | 1.00 | Crack | ○ | ○ | ○ | Comparative Example |
| 50 | 799 | 1.01 | Break | ○ | ○ | ○ | Comparative Example |
| 51 | 798 | 1.01 | Crack | ○ | ○ | ○ | Comparative Example |
| 52 | 800 | 1.01 | Break | ○ | ○ | ○ | Comparative Example |
| 53 | 760 | 1.00 | Crack | ○ | ○ | ○ | Comparative Example |
| 54 | 753 | 0.96 | Break | ○ | ○ | ○ | Comparative Example |
| 55 | 759 | 0.97 | Break | ○ | ○ | ○ | Comparative Example |
| 56 | 555 | 0.99 | Break | Break | Break | Break | Comparative Example |
| 57 | 791 | 1.00 | Break | ○ | ○ | ○ | Comparative Example |
| 58 | 845 | 1.00 | Break | ○ | ○ | ○ | Comparative Example |

Underline means outside of the range of the present invention.
*In No. 56, aspect ratio "x" means that the aspect ratio of austenite phase was unmeasurable because the microstructure was solely ferrite phase.

As can be seen from the results presented in Table 3, the steel pipes of the present examples all had excellent corrosion resistance. The steel pipes of the present examples also had superior axial tensile strength. The axial tensile yield strength and the compressive yield strength had small differences, and the threaded portion had excellent fatigue characteristics. In contrast, Comparative Examples failed to meet the required criteria with regard to any of corrosion resistance, axial tensile yield strength, and compressive yield strength/axial tensile yield strength ratio.

Example 2

Premium joints were evaluated for design of torque shoulder portions. As shown in Table 4, a fastening test (yield torque evaluation test) was conducted for threaded joints (premium joints) constructed from a pin (outer diameter Ø=88.9 mm, wall thickness t=6.5 mm, tensile strength=689 MPa) and a corresponding coupling.

Specifically, the test revealed that yielding occurs at a fastening torque of 3,000 N·m when the cross sectional area of the shoulder portion was less than 20% of the cross sectional area of the unworked portion of the pin. That is, a sufficiently high torque of 4,000 N·m or more can be applied to tighten the threads without yielding when the cross sectional area of the shoulder portion is at least 20% of the cross sectional area of the unworked portion of the pin. The required percentage is at least 25% for traditional duplex stainless steels having low strength against compression. The test confirmed that the duplex stainless steels according to aspects of the present invention, even with the shoulder portion having a cross sectional area at least 20% of the cross sectional area of the unworked portion of the pin, can advantageously receive a torque comparable to that achievable with traditional stainless steels. The results are presented in Table 4.

Another type of high-performance threaded joint that is currently in need is a threaded joint having sealability high enough to pass the seal test of ISO 13679:2019. To investigate the possibility for such a threaded joint, a seal test was conducted for threaded joints (premium joints) constructed from a pin (outer diameter Ø=88.9 mm, wall thickness t=6.5 mm, tensile strength=689 MPa) and a corresponding coupling, and threaded joints (premium joints) constructed from a pin (outer diameter Ø=244.5 mm, wall thickness t=13.8 mm) and a corresponding coupling, as shown in Table 5.

TABLE 4

| Steel pipe No. | Steel type | Thread fatigue test No. | Steel pipe size (Pin) | Nose length L (inches) | x/L | Cross sectional area ratio of shoulder portion | Result of thread test Yield torque [N · m] |
|---|---|---|---|---|---|---|---|
| 13 | E | E-1 | Ø 88.9 mm, | 0.25 | 0.03 | 0.20 | 3000 |
|  |  | E-2 | t 6.5 mm |  |  | 0.20 | 3000 |
|  |  | E-3 |  |  |  | 0.20 | 3000 |
| 15 |  | E-4 |  |  |  | 0.20 | 4000 |
|  |  | E-5 |  |  |  | 0.20 | 4000 |
|  |  | E-6 |  |  |  | 0.20 | 4000 |
| 35 | U | U-1 | Ø 88.9 mm, | 0.45 | 0.09 | 0.25 | 3000 |
|  |  | U-2 | t 6.5 mm |  |  | 0.25 | 3000 |
|  |  | U-3 |  |  |  | 0.25 | 3000 |
| 36 |  | U-4 |  |  |  | 0.25 | 4500 |
|  |  | U-5 |  |  |  | 0.25 | 4500 |
|  |  | U-6 |  |  |  | 0.25 | 4500 |
| 37 |  | U-7 |  |  |  | 0.50 | 7000 |
|  |  | U-8 |  |  |  | 0.50 | 7000 |
|  |  | U-9 |  |  |  | 0.50 | 7000 |

TABLE 5

| Steel pipe No. | Steel type | Thread fatigue test No. | Steel pipe size (Pin) | Nose length L (inches) | x/L | Seal test Sealability compression rate (%) |
|---|---|---|---|---|---|---|
| 13 | E | E-1 | Ø 88.9 mm, | 0.35 | 0.25 | 75 |
|  |  | E-2 | t 6.5 mm |  |  | 75 |
|  |  | E-3 |  |  |  | 75 |
| 15 |  | E-4 |  |  |  | 100 |
|  |  | E-5 |  |  |  | 100 |
|  |  | E-6 |  |  |  | 100 |
| 35 | U | U-1 | Ø 244.5 mm, | 0.90 | 0.45 | 83 |
|  |  | U-2 | t 13.8 mm |  |  | 83 |
|  |  | U-3 |  |  |  | 83 |
| 36 |  | U-4 |  |  |  | 100 |
|  |  | U-5 |  |  |  | 100 |
|  |  | U-6 |  |  |  | 100 |
| 37 |  | U-7 |  |  |  | 100 |
|  |  | U-8 |  |  |  | 100 |
|  |  | U-9 |  |  |  | 100 |

It was found from the results presented in Tables 4 and 5 that a threaded joint that can be made even with a shoulder having a smaller cross sectional area can be provided by using the stainless steel pipes according to aspects of the present invention. This characteristic provides more freedom in the design of threaded joints, and enables formation of two types of high-performance threaded joints, as follows.

As an example, a first type of high-performance threaded joint is a high-torque threaded joint capable of retaining sealability even under a high fastening torque. High torque performance can be obtained by using a stainless steel seamless pipe having high strength against compression, such as a stainless steel pipe according to aspects of the present invention. Even higher torque performance can be provided by appropriately designing the threaded joint. Specifically, a threaded joint is designed that has a length of 0.2 to 0.5 inches for the nose forming an unthreaded portion at the tip of the pin, and a ratio x/L of 0.01 to 0.1, where x represents the seal point position from the pipe end, and L is the nose length.

The seal test also revealed that a metal-to-metal seal portion having high airtightness can be provided when the length of the nose forming an unthreaded portion at the tip of the pin is preferably 0.3 to 1.0 inches, and the ratio x/L of the seal point position x from the pipe end with respect to the nose length L is preferably 0.2 to 0.5. With conventional materials, increasing the nose length and having a seal point further away from the pipe end necessitates a shoulder portion having a reduced cross sectional area. Such design is very likely to cause yielding, if possible at all. This problem becomes more pronounced in thin-walled steel pipes, and design of satisfactory steel pipes is not possible with a wall thickness of 6.5 mm. Stainless steel seamless pipes according to aspects of the present invention have high strength against compression, and can avoid the yielding problem when the cross sectional area of the shoulder portion is 20% or more. This enabled design that satisfies high sealability while providing a sufficient cross sectional area for the shoulder portion. As shown in Table 5, it was confirmed that steel pipes having an axial compressive yield strength/axial tensile yield strength ratio of 0.85 or more can pass the seal test at at least 85% compression rate under the test load of ISO 13679:2019.

The invention claimed is:

1. A stainless steel pipe of a composition that comprises, in mass %, C: 0.005 to 0.08%, Si: 0.01 to 1.0%, Mn: 0.01 to 10.0%, Cr: 20 to 35%, Ni: 1.0 to 15.0%, Mo: 0.5 to 6.0%, N: 0.150 to less than 0.400%, and W: 1.9% or less, and one or two or more selected from Ti: 0.0001 to 0.3%, Al: 0.0001 to 0.3%, V: 0.005 to 1.5%, and Nb: 0.005 to less than 1.5%, and in which the balance is Fe and incidental impurities, the composition containing N, Ti, Al, V, and Nb so as to satisfy the following formula (1), $$0.150 > N - (1.58Ti + 2.70Al + 1.58V + 1.44Nb) \quad (1)$$

wherein N, Ti, Al, V, and Nb represent the content of each element in mass % (the content is 0 (zero) percent for elements that are not contained), the stainless steel pipe having an axial tensile yield strength of 757 MPa or more, an axial compressive yield strength/axial tensile yield strength ratio of 0.85 to 1.15, and a microstructure that is 20 to 80% ferrite phase by volume with the remainder containing an austenite phase, the stainless steel pipe having pipe end portions at least one of which has a fastening portion for an external thread or an internal thread, and having a curvature radius of 0.2 mm or more and 0.4 mm or less for a corner R formed by a bottom surface of a thread root and a pressure-side flank surface of the thread, measured in an axial plane section of the fastening portion.

2. The stainless steel pipe according to claim 1, wherein the composition further comprises, in mass %, at least one of selected from Groups A, B and C:

Group A:
Cu: 4.0% or less,
Group B: one or two or more selected from
B: 0.010% or less, Zr: 0.10% or less, Ca: 0.010% or less, Ta: 0.3% or less, REM: 0.10% or less, and Mg: 0.10% or less, and
Group C: one or two or more selected from
Sn: 0.30% or less, Sb: 0.30% or less, and Ag: 0.30% or less.

3. The stainless steel pipe according to claim 1, wherein the stainless steel pipe is a seamless steel pipe.

4. The stainless steel pipe according to claim 2, wherein the stainless steel pipe is a seamless steel pipe.

5. The stainless steel pipe according to claim 1, wherein the corner R has a curvature radius of 0.3 mm or more and 0.4 mm or less.

6. The stainless steel pipe according to claim 2, wherein the corner R has a curvature radius of 0.3 mm or more and 0.4 mm or less.

7. The stainless steel pipe according to claim 3, wherein the corner R has a curvature radius of 0.3 mm or more and 0.4 mm or less.

8. The stainless steel pipe according to claim 4, wherein the corner R has a curvature radius of 0.3 mm or more and 0.4 mm or less.

9. The stainless steel pipe according to claim 5, wherein the fastening portion has a metal-to-metal seal portion and a torque shoulder portion.

10. The stainless steel pipe according to claim 6, wherein the fastening portion has a metal-to-metal seal portion and a torque shoulder portion.

11. The stainless steel pipe according to claim 7, wherein the fastening portion has a metal-to-metal seal portion and a torque shoulder portion.

12. The stainless steel pipe according to claim 8, wherein the fastening portion has a metal-to-metal seal portion and a torque shoulder portion.

13. A method for manufacturing a stainless steel pipe of claim 1,
the method comprising circumferential bending and unbending.

14. A method for manufacturing a stainless steel pipe of claim 2,
the method comprising circumferential bending and unbending.

15. A method for manufacturing a stainless steel pipe of claim 3,
the method comprising circumferential bending and unbending.

16. A method for manufacturing a stainless steel pipe of claim 4,
the method comprising circumferential bending and unbending.

17. A method for manufacturing a stainless steel pipe of claim 5,
the method comprising circumferential bending and unbending.

18. A method for manufacturing a stainless steel pipe of claim 6, the method comprising circumferential bending and unbending.

19. A method for manufacturing a stainless steel pipe of claim 7,
the method comprising circumferential bending and unbending.

20. A method for manufacturing a stainless steel pipe of claim 8,
the method comprising circumferential bending and unbending.

\* \* \* \* \*